(12) United States Patent
Berglund

(10) Patent No.: US 9,085,408 B2
(45) Date of Patent: Jul. 21, 2015

(54) GARMENT BAG SYSTEMS AND METHODS OF USE

(71) Applicant: Stephen E. Berglund, Fresno, CA (US)

(72) Inventor: Stephen E. Berglund, Fresno, CA (US)

( * ) Notice: Subject to any disclaimer, the term of this patent is extended or adjusted under 35 U.S.C. 154(b) by 315 days.

(21) Appl. No.: 13/688,183

(22) Filed: Nov. 28, 2012

(65) Prior Publication Data

US 2013/0118930 A1 May 16, 2013

Related U.S. Application Data

(63) Continuation-in-part of application No. 13/041,625, filed on Mar. 7, 2011, now Pat. No. 8,689,973, which is a continuation-in-part of application No. 12/703,673, filed on Feb. 10, 2010, now abandoned, and a continuation-in-part of application No. 29/386,118, filed on Feb. 24, 2011, now Pat. No. Des. 651,404, which is a continuation-in-part of application No. 29/355,347, filed on Feb. 5, 2010, now Pat. No. Des. 637,396, and a continuation-in-part of application No. 29/355,588, filed on Feb. 10, 2010, now Pat. No. Des. 633,715.

(51) Int. Cl.
| | |
|---|---|
| *B65D 85/18* | (2006.01) |
| *A47G 25/02* | (2006.01) |
| *A47G 25/00* | (2006.01) |
| *A47B 61/00* | (2006.01) |
| *A45C 3/00* | (2006.01) |
| *A47G 25/54* | (2006.01) |
| *A45C 13/03* | (2006.01) |
| *A45C 7/00* | (2006.01) |
| *B65D 33/12* | (2006.01) |
| *B65D 33/14* | (2006.01) |

(52) U.S. Cl.
CPC ............... *B65D 85/18* (2013.01); *A45C 3/004* (2013.01); *A45C 7/0077* (2013.01); *A45C 13/03* (2013.01); *A47B 61/003* (2013.01); *A47B 61/006* (2013.01); *A47G 25/00* (2013.01); *A47G 25/02* (2013.01); *A47G 25/54* (2013.01); *B65D 33/12* (2013.01); *B65D 33/14* (2013.01)

(58) Field of Classification Search
CPC ........ B65D 85/18; B65D 33/14; B65D 33/12; A47G 25/02; A47G 25/00; A47G 25/54; A47B 61/003; A47B 61/06; A45C 7/0077; A45C 13/03; A45C 3/004
See application file for complete search history.

(56) References Cited

U.S. PATENT DOCUMENTS

| | | | |
|---|---|---|---|
| 1,305,797 | A | 6/1919 | Henderson |
| 1,452,644 | A | 4/1923 | Kennedy |

(Continued)

OTHER PUBLICATIONS

Cleaner's Supply advertisement for "Converta" bag dated Jan. 4, 2010.

(Continued)

*Primary Examiner* — Tri Mai
(74) *Attorney, Agent, or Firm* — Mark D. Miller; William K. Nelson

(57) ABSTRACT

The present invention includes methods and apparatus in which a reusable bag is provided for the collection and return of soiled garments, laundry and/or other clothing items. The bag may be provided in the form of a hamper that is open at the top, with one or more hooks that allow the bag to be hung from a clothing rod, and is provided with engagement devices that allow the bag to be folded up when not in use, and then unfolded to various levels for containment and protection of clean items that have been hung on standard hangers. In some embodiments, garment protection flaps and a detachable accessory bag are provided inside the bag.

13 Claims, 29 Drawing Sheets

(56) References Cited

U.S. PATENT DOCUMENTS

| | | | |
|---|---|---|---|
| 1,463,002 A | 7/1923 | Barnet |
| 1,476,423 A | 12/1923 | Salisbury |
| 1,537,956 A | 5/1925 | McNally |
| 1,666,704 A | 4/1928 | Hunter |
| 1,870,169 A | 8/1932 | Brown |
| 2,088,232 A | 7/1937 | Cumming |
| D115,502 S | 7/1939 | Kohl |
| 2,170,841 A | 8/1939 | Thies |
| 2,210,755 A | 8/1940 | Frank |
| 2,534,380 A | 12/1950 | Schwartzman |
| 2,637,424 A | 5/1953 | Duskin |
| D174,064 S | 2/1955 | Snook |
| D179,745 S | 2/1957 | Snook |
| 2,815,785 A | 12/1957 | Vail |
| 2,861,735 A | 11/1958 | Faltin |
| 3,142,324 A | 7/1964 | Fremont |
| 3,164,187 A | 1/1965 | Simmons |
| 3,388,777 A | 6/1968 | Nolan |
| 3,495,763 A | 2/1970 | Schmidt |
| 3,558,038 A | 1/1971 | Gelles |
| D223,700 S | 5/1972 | Kamins et al. |
| 3,670,947 A | 6/1972 | Tangredi et al. |
| 3,929,224 A | 12/1975 | Smith, Jr. |
| 3,934,497 A | 1/1976 | Hannah |
| D242,764 S | 12/1976 | Kamins |
| 4,000,768 A | 1/1977 | Siegel |
| 4,084,689 A | 4/1978 | Yamagata |
| 4,189,036 A | 2/1980 | Pelavin |
| 4,244,453 A | 1/1981 | Herz |
| 4,390,087 A | 6/1983 | Goldfinger |
| 4,391,396 A | 7/1983 | Brady |
| 4,401,219 A | 8/1983 | Mink |
| 4,438,844 A | 3/1984 | Kesselman et al. |
| D282,315 S | 1/1986 | Allen |
| 4,580,667 A | 4/1986 | Herwood |
| 4,590,610 A | 5/1986 | Rhyne |
| D307,360 S | 4/1990 | McAllister |
| 5,002,183 A | 3/1991 | Okano |
| 5,010,987 A | 4/1991 | Evans |
| D321,790 S | 11/1991 | Martorella |
| 5,062,717 A | 11/1991 | Shockley |
| 5,065,864 A | 11/1991 | Schmitt |
| 5,090,559 A | 2/1992 | Gendreau |
| D327,371 S | 6/1992 | Walker |
| 5,117,974 A | 6/1992 | Bieber |
| 5,253,775 A | 10/1993 | Gould |
| 5,370,230 A | 12/1994 | Cox |
| D369,025 S | 4/1996 | Miller |
| D371,737 S | 7/1996 | May |
| D377,863 S | 2/1997 | Van Skiver |
| 5,628,398 A | 5/1997 | Jackson |
| D383,904 S | 9/1997 | Stewart |
| D385,419 S | 10/1997 | Ibigbami |
| D422,903 S | 4/2000 | Lim |
| 6,296,094 B1 | 10/2001 | Knecht |
| 6,708,819 B1 | 3/2004 | Lee |
| 6,811,027 B2 | 11/2004 | Alexander |
| D499,548 S | 12/2004 | Deutschendorf et al. |
| D505,547 S | 5/2005 | Whipple |
| D602,760 S | 10/2009 | Davis |
| D633,715 S | 3/2011 | Berglund |
| D637,396 S | 5/2011 | Berglund |
| D651,404 S | 1/2012 | Berglund |
| 2003/0102230 A1 | 6/2003 | Gregorcic |
| 2003/0179958 A1 | 9/2003 | Chiang et al. |
| 2007/0183691 A1 | 8/2007 | Finnegan |

OTHER PUBLICATIONS

Advertisement for "Green Garmento" bag, American Drycleaner, p. 25, Jan. 2010.
U.S. Trademark Registration No. 1768697 dated May 14, 1993.

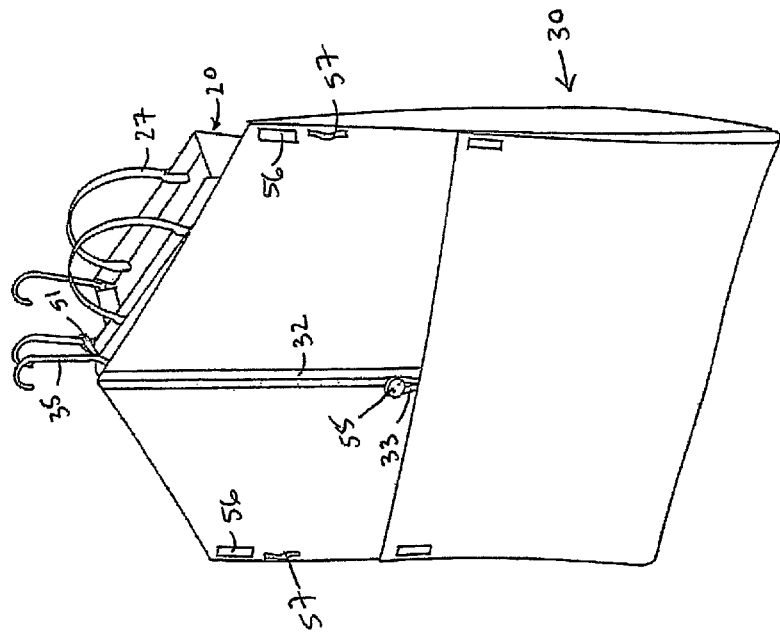
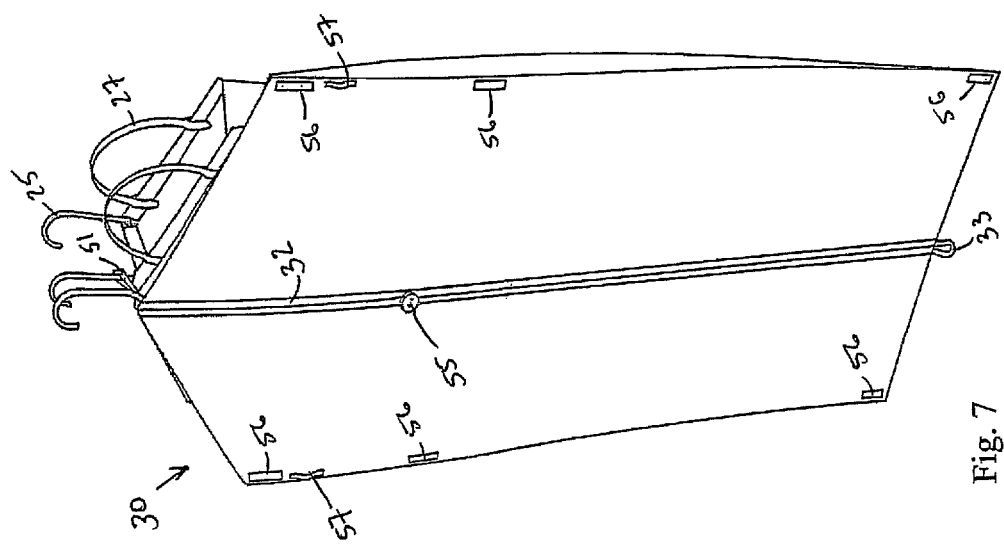

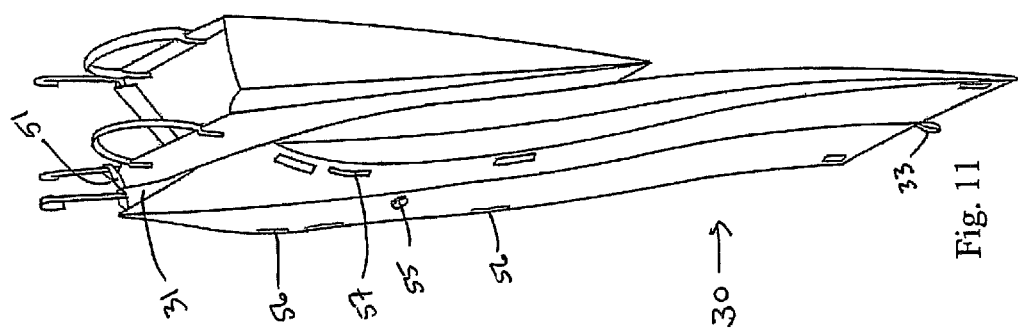

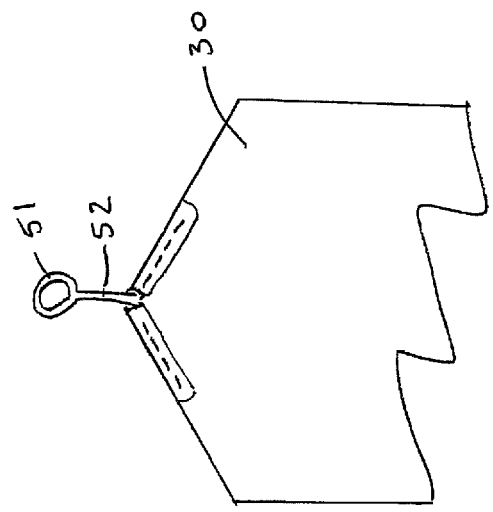
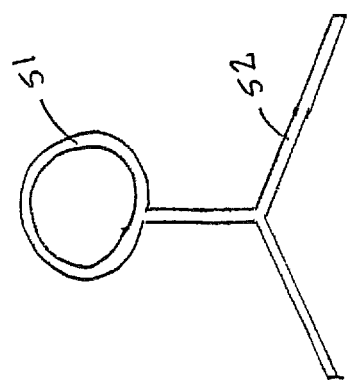
Fig. 12B
Fig. 12A

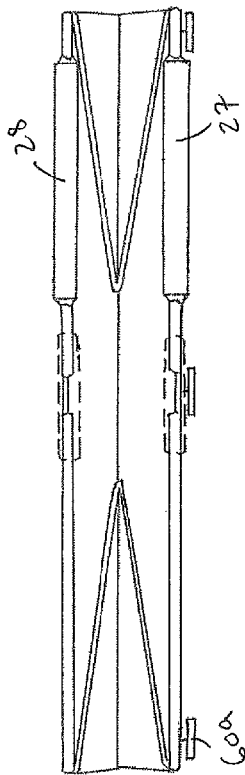
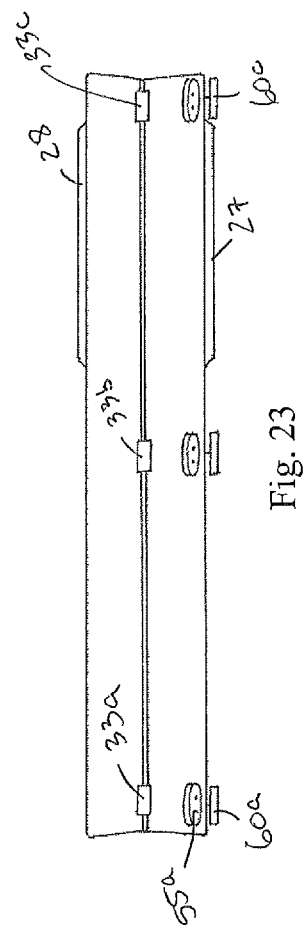
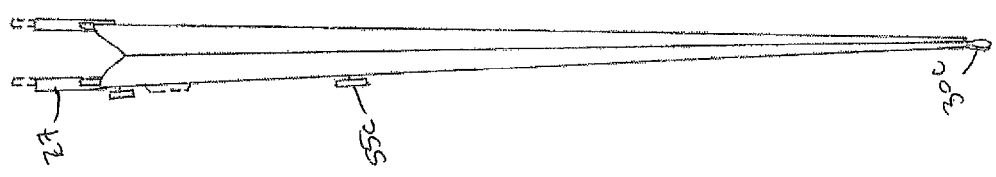

GARMENT BAG SYSTEMS AND METHODS OF USE

PRIORITY CLAIM

This is a continuation-in-part of U.S. Utility patent application Ser. No. 13/041,625 filed on Mar. 7, 2011, which was a continuation-in-part of U.S. Utility patent application Ser. No. 12/703,673 filed on Feb. 10, 2010, which was a continuation in part of and claimed the benefit of U.S. Design patent application Ser. No. 29/386,118 filed on Feb. 24, 2011, now U.S. Pat. No. D651,404, which was a continuation-in-part of, and claimed the benefit of U.S. Design patent application Ser. No. 29/355,347 filed on Feb. 5, 2010, now U.S. Pat. No. D637,396, and which was a continuation-in-part of, and claimed the benefit of U.S. Design patent application Ser. No. 29/355,588 filed on Feb. 10, 2010, now U.S. Pat. No. D633,715, all of which are incorporated herein in their entirety by this reference.

BACKGROUND OF THE INVENTION

1. Field of the Invention

The present invention relates to the transportation of garments, clothing and other items to and from a laundry or dry cleaner, and more particularly to improved multiple garment bag systems and methods of use that conserve natural resources by avoiding unnecessary use of polypropylene garment and dry cleaning bags.

2. Description of Related Art

Bags for carrying dry cleaning and laundry, as well as luggage for carrying garments are known in the art. Often, dry cleaning and laundry service providers will provide reusable bags to their customers for use in collecting soiled or dirty laundry, garments and/or other items of clothing to be laundered or dry cleaned. When full, the bag filled with such items is delivered to the facilities of the laundry or dry cleaner. The items are then cleaned, and folded or hung on hangers by the cleaner according to instructions from the customer. Typically, large polypropylene sheets or bags are pulled over groups of clean hanging items to prevent them from being soiled during the return trip to the customer. The empty garment bag is also returned.

A typical reusable laundry or dry cleaning transport bag has an opening at one end that may be opened wide for insertion of garments, clothing and/or other items and then pulled closed using a drawstring or other cord. Another well known style of reusable laundry bag is provided with one or more hooks that allow the bag to be hung from a closet clothing rod for convenient storage, such as those shown in U.S. Pat. Nos. 2,815,785; 5,370,230 and 6,708,819. Such bags are typically only used for transportation of dirty or soiled items. Once cleaned, these items are not returned to the customer in the same bag, but are separately hung and wrapped in polypropylene, or folded and placed in containers such as boxes, or the like.

The use of polypropylene bags in the laundry/dry cleaning industry is wasteful in that they are made from scarce petroleum resources, and they are almost immediately discarded following return of the cleaned garments to the customer. In addition, large polypropylene sheets and bags pose a suffocation hazard to small children. The garment bag disclosed in U.S. Pat. No. 5,090,559 avoids the use of polypropylene by providing a dual-use bag having a large opening with a drawstring at one end, and a small opening at the other end. The bag is cleaned along with the laundry, then inverted, and pulled over the clean laundry, with the hanger hook(s) protruding through the small opening in the opposite end. However, this invention requires that the bag itself be made of sufficiently flexible, cleanable material which is likely to wear out in a relatively short period of time after several cleanings.

It is therefore desirable to provide systems, methods and apparatus for transportation of garments, clothing and other related items that avoids the use of polypropylene for the return of dry cleaned and laundered items, and that provides durable and long-lasting bags that may be used over and over to collect and return cleaned garments and clothing items to a customer.

SUMMARY OF THE INVENTION

The present invention includes methods and apparatus in which a first reusable bag is provided for the collection of soiled garments, laundry and/or other clothing items, and a second (and sometimes a third) reusable bag is provided for the return of these items after they have been cleaned. In some embodiments of the invention, the first bag is provided in the form of a hamper that is open at the top, and has one or more hooks that allow the bag to be hung from a clothing rod, such as those found in a closet. One or more handles may also be provided on the first bag to facilitate easy transport.

In most embodiments, the first bag is made of durable fabric, canvas, or the like, and includes an upper opening that may be opened wide to receive soiled or dirty garments, laundry and/or other clothing items. In these embodiments, the first bag includes two broad opposing side panels that are attached together at the bottom, and two opposing foldable end panels between the broad side panels, the four panels forming a hamper with an open top. As clothing items are inserted into the first bag in these embodiments, the end panels unfold to allow the bag to receive them. In these embodiments, a first hook is provided at a top edge of one of the side panels, and a second hook is provided at a top edge of the other side panel. These hooks are used to hang the first bag from a clothing rod, for example in a wardrobe closet or armoire. In these embodiments, a first handle may be provided along the top edge of one of the side panels, and a second handle may be provided along the top edge of the other side panel to allow a user to grasp and hold the bag during transport. The handles may be attached using a snap mechanism that will allow for the handles to be removed when the bag needs to be laundered.

Embodiments of the invention include a second foldable bag that is provided with and may be attached to the first bag, the second bag being in a form that may be folded up when not in use, and then unfolded for containment of clean clothing and garments that have been hung on hangers. However, it is to be appreciated that the second bag described herein may be provided alone, by itself, without the first bag.

In some embodiments, the second bag may include one or more attachment means (buttons, loops, snaps, Velcro®, or the like) to hold the folded portions of the second bag together when not in use. In several embodiments, the second bag is provided with a strap or loop at its bottom that is placed over a hook at the top of the adjacent side panel of the first bag to hold the folded second bag in place against the side panel.

In many embodiments, the second bag includes an elongated opening along one side for receiving garments hung on hangers, and an opening at the top to receive these hanger hooks. The side opening may be closed using a zipper or other attachment means (buttons, loops, snaps, Velcro®, or the like) for closing the second bag around clean garments. In some embodiments, the second bag may include a loop or strap near the top that may be placed over one of the hooks of the first garment bag for holding the second bag adjacent to the first. In some embodiments, the second bag may include a metal piece or bracket near the top having an opening therein that may be placed over one of the hooks of the first garment bag for holding the second bag adjacent to the first.

In some embodiments, the second bag may include one or more attachment means (buttons, loops, snaps, Velcro®, D-rings, or the like) for folding portions of the second bag against other portions of the second bag for partial folding of the second bag. These attachment means allow the second bag to be partially folded while holding shorter clean garments such as shirts or blouses, and allows the bag containing clean garments to be placed, for example, on a separate conveyor at the dry cleaning facility for shorter garments. Different placement of the attachment means on the second bag allow for it to be folded against itself to different lengths. In an unfolded position, the second bag may receive longer garments (such as full length dresses) and placed on a different conveyor at the dry cleaning facility used to hold longer garments.

In some embodiments the second bag may include expandable pleats along its sides; in these embodiments, the second bag may also include one or more upper flaps that may be folded over the tops of the numerous garments inside the second bag to protect the tops of these garments from dust, dirt, water or other materials when the filled bag has been expanded open. In some embodiments, the first bag is made of a more durable and less flexible material than the second bag; in other embodiments the first and second bags are made of the same type of material.

In some embodiments, a loop or metal bracket having an opening therein may be provided in the second bag to be looped over one of the hooks of the first bag in order to keep the two bags adjacent to one another. In most embodiments, the second bag is longer than the first bag, and is designed to be long enough to hold a cleaned suit, dress or gown. In many embodiments, the second bag is provided in the form of a suit bag, and is designed to be folded up into a compact form against a side panel of the first bag when not in use (e.g., when dirty items are being collected in the first bag). In some of these embodiments, the second bag is provided with an opening at its top for receiving the hanger hooks of cleaned items when they are inserted into the unfolded second bag. In some embodiments of the second bag, this upper opening is larger in order to accommodate many garment hangers, and one or more internal flaps are provided to be folded over the tops of the garments to protect them from dust, dirt, water and other materials.

In some embodiments, the second bag may be attached to one of the side panels of the first bag, with the top of the second bag being attached at, near or along a portion of the top edge of the first bag side panel. If the second bag is detachable, it may be temporarily held in place against the side panel of the first bag using the loop, strap or metal bracket described above, or one or more snaps, buttons, clips, zippers, inter-engaging hooks and loops (Velcro®), or the like. These alternative attachment devices are preferably provided at the top of the second bag, but may alternatively be provided in other locations in order to secure the second bag against a side panel of the first bag.

In some embodiments, a third bag having some or all of the same features as the second bag may be provided for use on the opposite side panel of the first bag, to provide additional capacity for the return of cleaned items.

In some embodiments, the second bag is provided standalone, without the first bag.

In alternative embodiments, an optional, detachable accessory bag may be provided for insertion inside the first bag of the invention. In these embodiments, the accessory bag is made of a mesh or netting material, and is designed for attachment to an inside of one of the side panels of the first bag. The accessory bag may be temporarily held in place inside the first bag using one or more snaps, buttons, clips, zippers, inter-engaging hooks and loops (Velcro®), or the like. The accessory bag may include a zipper along an edge (e.g. along the top) for opening and closing the accessory bag for insertion and removal of small items of clothing. The accessory bag containing small clothing items inside is designed to be removed and cleaned with the small clothing items inside it.

In other embodiments of the invention there is one bag that functions as both the hamper for soiled laundry and a bag for clean clothing. In these and other embodiments D-rings and hooks may be used instead of buttons and straps to adjust the length of the bag. In such embodiments, one or more D-rings are provided on one side of the bag, and one or more clips or hooks are provided at the bottom of the bag. Preferably two clips are provided at the bottom of the bag, and at least two D-rings are provided on the side of the bag, one for receiving each of the clips. Additional D-rings may be provided for each clip at various positions along the side of the bag along a generally vertical orientation allowing the associated clip to be attached to one of them. When multiple D-rings are provided in this way, they allow the bottom clips to be attached at different positions along the side of the bag. Attaching a clip to an upper D-ring will cause the bag to be folded against itself, restricting the amount of space available inside the open-topped part of the bag. However, attaching a clip to a lower D-ring will cause less of the bag to be folded against itself, leaving more room inside the open-topped part of the bag. Reinforcement may be provided for the D-rings in the form of straps or other fabric stitched to the inside or outside of the bag in the vicinity of the D-rings.

Embodiments of the garment bags of the present invention may also include a cord or drawstring for holding the top of the bag closed. A thumb spring or other suitable clasp may be used to hold the bag in a closed position. In one embodiment, a nylon cord is inserted through the necks of both hangers, and washers are provided on the outsides of the necks to prevent the cord from being pulled therethrough. The bag may be held closed using the cord by moving the thumb spring or clasp along the cord with the washer to pull the two hangers of the bag together, and then leaving the thumb spring tightly engaged against the cord in this position. It is to be appreciated that the thumb spring and washer may be moved up and down the cord and tightened to the desired length. This cord and washer mechanism makes it possible to hold the bag in a closed position.

Exemplary Method of Use

In typical methods of use, the user hangs the first bag on a clothing rod in a closet, with the second bag folded up against one side of the first bag. Soiled garments and clothing items are collected in the first bag until it is full enough to take to the laundry/dry cleaner. The laundry/dry cleaner removes the garments and clothing items from the first bag and cleans them. The clean garments and clothing items are then hung on hangers. The second bag is unfolded and unzipped, and the clean hanging items are inserted into the second bag, with their hanger hooks protruding through the opening in the top of the second bag. The second bag is then zipped up to protect the clean items inside, and returned to the user, with the second bag protecting the clean items during transport. In some embodiments, if only short items (shirts or blouses) are inserted into the second bag, it may be partially folded up with the clean items inside so that it may fit onto a conveyor for shorter garments. In some embodiments, if a large number of items may be placed in the second bag causing the upper opening to be opened wide, flaps inside the second bag may be folded over the tops of these items to protect them from foreign materials that could enter through the opening. Upon or following return of the bags, the user removes the clean items from the second bag, and then folds the second bag up against a side of the first bag. The cycle is then repeated, with dirty and soiled garments again being collected in the first bag until it is full enough to take to the laundry/dry cleaner.

In the single-bag embodiments of the present invention, the bag is hung in a closet or armoire. If space is an issue, the bottom of the bag may be brought up against one side using any of the embodiments described (e.g. D-rings and clips, buttons and snaps, interengaging hooks/loops, buttons and loops, etc.). This shortens the length of the bag and reducing both the interior space available to receive soiled garments as well as the space the bag takes up in the closet or armoire. Attaching the bottom of the bag near the top will reduce the interior space the most, while attaching the bottom of the bag near the middle will allow for a larger space. Once filled, the bag is taken to the cleaner who cleans the garments, and then returns the cleaned garments in the bag. The bag may be partially folded up to half-length accommodate shorter garments such as shirts and blouses, which will allow the bag to be used on a half-length conveyor at the cleaner; or it may be opened to full length, if necessary, to accommodate lengthy clothing items, such as dresses, and placed on the full-length conveyor.

It is to be appreciated that use of the multiple bag systems and the single-bag systems of the present invention avoid the need for wasteful use of polypropylene sheets, bags or other wrapping around the cleaned garments or clothing items. It is also to be appreciated that it is not necessary to clean the bags of the multiple bag systems of the present invention since dirty and soiled items will always be placed in the first bag, and cleaned items will always be placed in the second (and third) bag. In the single bag system the hangers are easily removed in order for the bag to be cleaned.

It is therefore an object of the present invention to provide methods and apparatus for protecting garments and clothing items as they are transported to and from a laundry/dry cleaner without the use of polypropylene bags or sheets, thereby saving resources such as plastic.

It is also an object of the present invention to provide a convenient reusable transport system for garments, clothing and other items that protects cleaned items during their return.

It is also an object of the present invention to provide a bag that may be folded against itself at half-length so that it may be placed on the half-length conveyor at a laundry/cleaner.

These and other objects, advantages, and features of the invention, together with methods for using of the invention, will become apparent from the following detailed descriptions, drawings and claims herein.

BRIEF DESCRIPTION OF THE DRAWINGS

FIG. 7 is a perspective view of another embodiment of the present invention with the second bag in an unfolded condition.

FIG. 8 is a perspective view of the embodiment of FIG. 7 with the second bag in a partially folded condition.

FIG. 11 is a side perspective view of the embodiment of FIG. 7.

FIG. 12A is a perspective view of a metal bracket used with embodiments of the invention.

FIG. 12B is a perspective view of a metal bracket installed and in use with an embodiment of the invention.

FIG. 20 is a left side view of the embodiment of FIG. 17.

FIG. 21 is a right side view of the embodiment of FIG. 17.

FIG. 22 is a top plan view of the embodiment of FIG. 17.

FIG. 23 is a bottom plan view of the embodiment of FIG. 17.

FIG. 26 is a perspective view of an embodiment of the present invention in an open condition showing internal flaps folded in.

FIG. 28 is a top perspective view of an embodiment of the present invention in an open condition showing internal flaps folded in.

DETAILED DESCRIPTION

Figure 1:
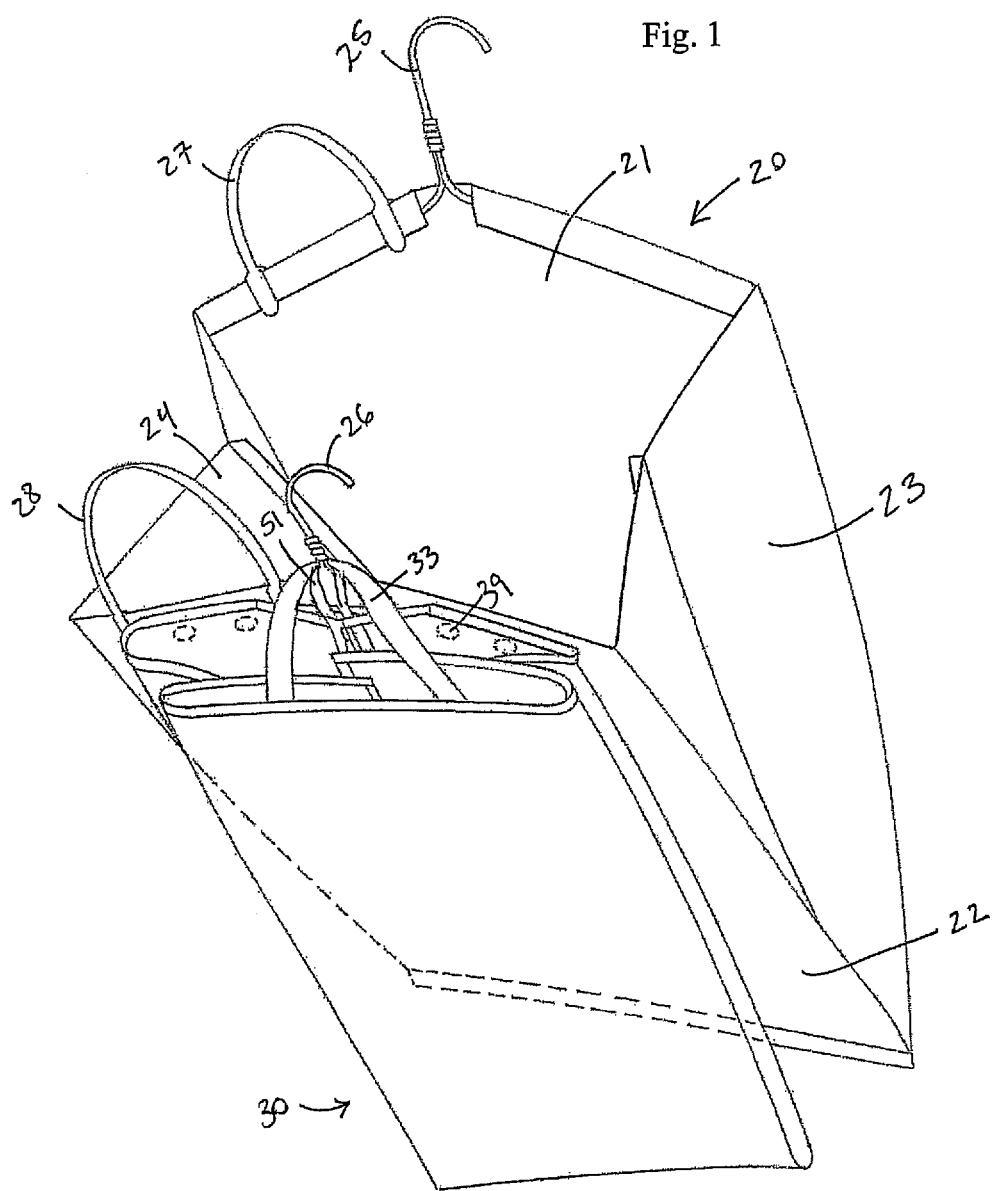
FIG. 1 is a perspective view of an embodiment of the present invention.
Figure 2:
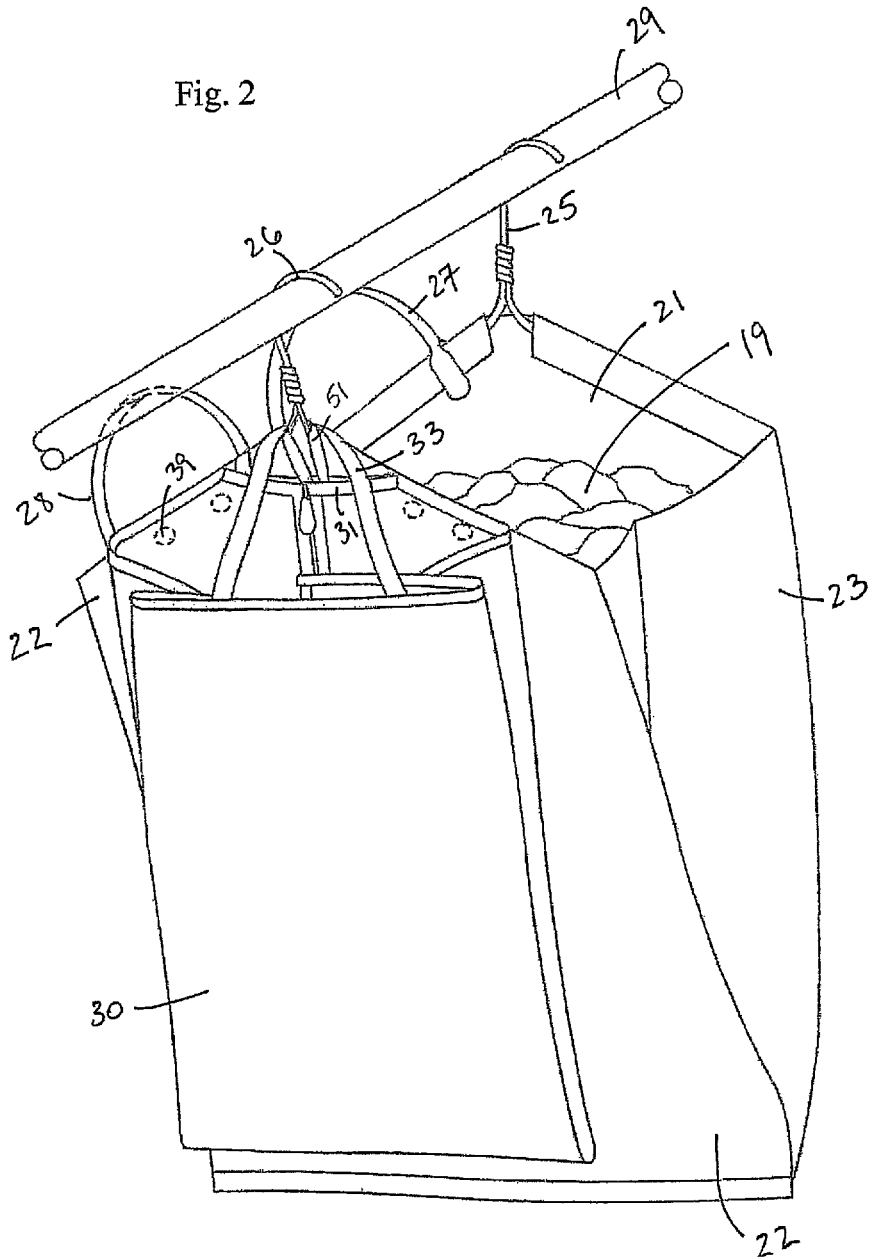
FIG. 2 is a perspective environmental view of the embodiment of FIG. 1 with the second bag in a folded condition.
Figure 3:
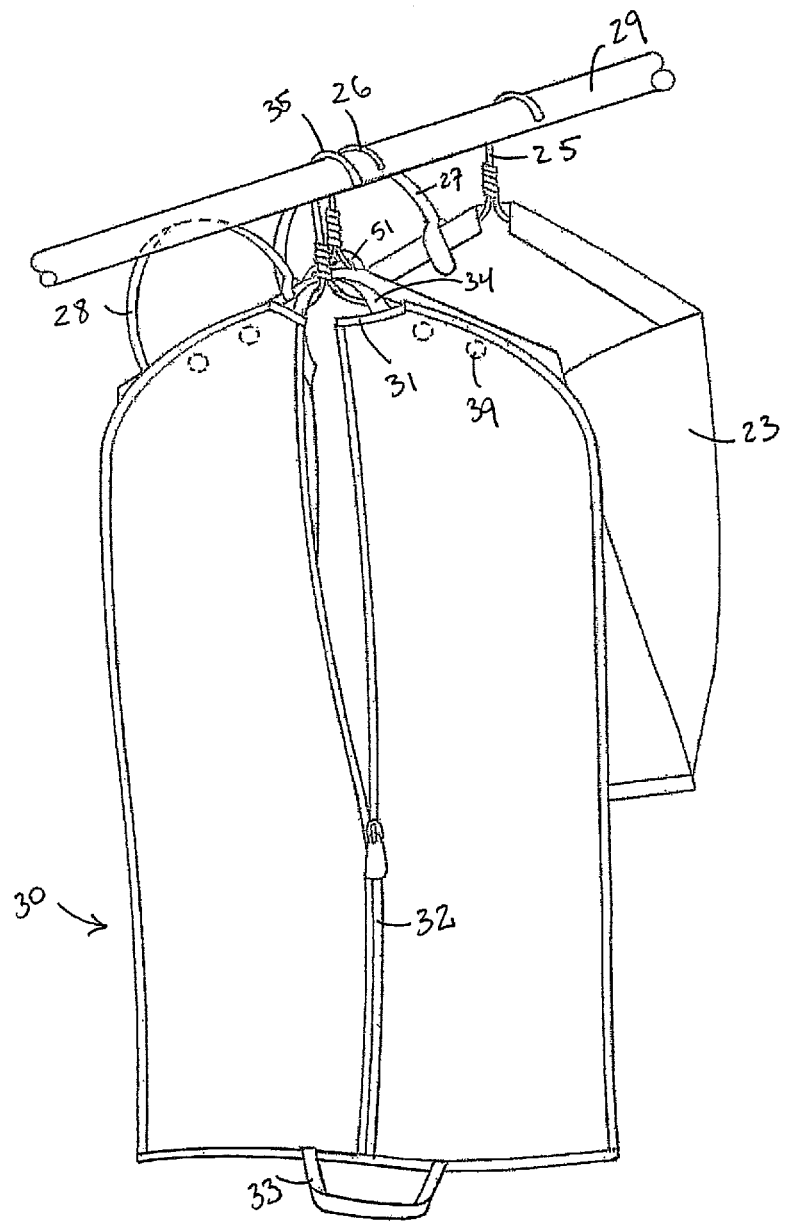
FIG. 3 is a perspective environmental view of the embodiment of FIG. 1 with the second bag in an unfolded condition.

Referring to the drawings wherein like reference characters designate like or corresponding parts throughout the several views, and referring particularly to the illustrated exemplary embodiment of FIGS. 1-3, it is seen that these embodiments of the invention include a first bag 20 having two broad opposing side panels 21, 22 that are attached together at the bottom, and two opposing foldable end panels 23, 24 between the side panels, the four panels 21-24 forming a hamper with an open top. As clothing items 19 are inserted into the first bag 20, the end panels 23, 24 unfold as shown in FIG. 2. In the illustrated embodiment, a first hook 25 is provided at a top edge of side panel 21, and a second hook 26 is provided at a top edge of the other side panel 22. Hooks 25, 26 are used to hang the first bag 20 from a clothing rod 30, as shown in FIGS. 2 and 3. A first handle 27 may be provided along the top edge of side panel 21, and a second handle 28 may be provided along the top edge of the other side panel 22 to allow a user to grasp and hold bag 20 during transport.

In the illustrated exemplary embodiment of FIGS. 1-3, a second bag 30 is provided adjacent to side panel 22. The top of the second bag 30 may be attached at, near or along a portion of the top edge of side panel 22. An outer loop 51 may be provided at the top of the second bag 30 that may be engaged over one of the hooks 25, 26 of the first bag 20. In these embodiments, bags 20 and 30 may be separated from each other by disengaging loop 51 from hook 25 or 26. Loop 51 may be in the form of a cord or strap, or may be provided in the form of a metal bracket 52 shown in FIGS. 12A-B having a loop 51 at the top for engagement over one of hooks 25, 26. An optional loop 34 may be provided with bag 30 to hold these hanger hooks 35 together. It is to be appreciated that bag 30 may be provided on the other side panel 23.

FIGS. 1 and 2 show the second bag 30 folded up into a compact form against side panel 22 when not in use (e.g., when dirty items 19 are being collected in the first bag 20). Bag 30 is provided with an opening 31 at its top for receiving the hanger hooks 35 of cleaned items when they are inserted into the unfolded second bag, as shown in FIG. 3 and in other figures. Bag 30 is also provided with a strap or loop 33 at its bottom that may be placed around the hook at the top of the adjacent side panel (e.g. 26) of the first bag 20 to hold the folded second bag 30 in place against the side panel 22, as shown in FIGS. 1 and 2. A zipper 32 or other closing device is provided along one side of bag 30 for opening and closing the bag for insertion and removal of clean garments, clothing and other items.

In the illustrated embodiment of FIGS. 1-3, bag 30 may or may not be attached to the side panel 22 of bag 20. If they are not attached, loop 51 is used to hold bag 30 against bag 20. In the illustrated embodiments of FIGS. 1-6, a plurality of optional snaps 39 are provided along the top of one side of bag 30 for temporary attachment to corresponding snaps along the top of side panel 22. It is to be appreciated that snaps 39 may be replaced with suitable buttons, clips, zippers, inter-engaging hooks and loops (Velcro®), or the like. The attachment devices 39 are preferably provided at the top of bag 20 and panel 22, but may alternatively be provided in other locations in order to secure the second bag 30 against a side panel 22 of the first bag 20.

In the embodiment shown in FIGS. 4-6, and FIGS. 42-43, an optional, detachable accessory bag 41 is provided for insertion inside a larger bag, such as bag 20. In these embodiments, accessory bag 41 is made of a mesh or netting material, and is attached to the inside of one of the side panels of the first bag, such as 21. Accessory bag 41 may be temporarily held in place using one or more snaps, buttons, clips, zippers, inter-engaging hooks, loops (Velcro®), D-rings, or the like 44. In the illustrated embodiment, buttons 44 are provided on panel 21, and loops 43 are provided on bag 41 for engagement with buttons 44. The accessory bag 41 may include a zipper 45 along an edge (e.g. along the top) for opening and closing the accessory bag for insertion and removal of small items of clothing. It is to be appreciated that the accessory bag 41 may be provided with any of the embodiments of the invention disclosed herein.

In the illustrated exemplary embodiments of FIGS. 7-11, loop 51 is provided at the top of the second bag 30 that may be engaged over one of the hooks 25, 26 of the first bag 20. In these embodiments, bags 20 and 30 may be separated from each other by disengaging loop 51 from hook 25 or 26. Loop 51 may be in the form of a cord or strap, or may be provided in the form of a metal bracket 52 having a loop 51 at the top for engagement over one of hooks 25, 26. As shown in FIGS. 12A-B, bracket 52 may include arms that may be sewn into or otherwise attached to the top of bag 30 such that loop 51 protrudes out at the top. An optional loop 34 may be provided with bag 30 to hold hanger hooks 35 together.

Figure 9:
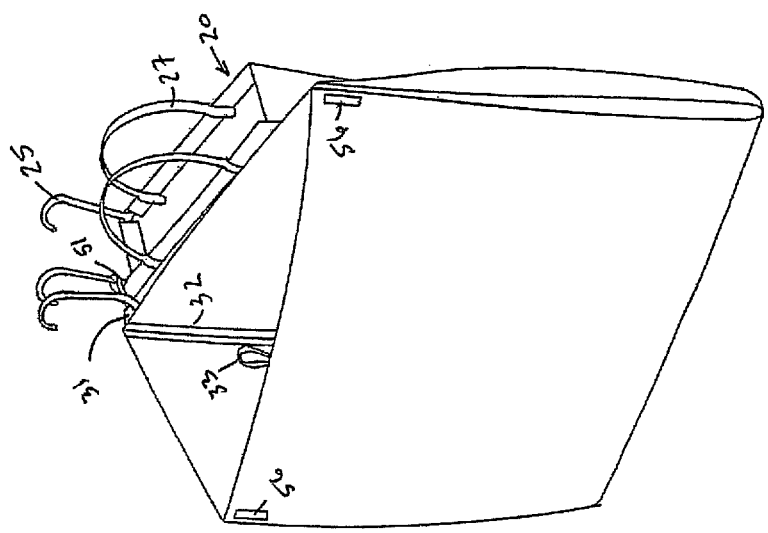
FIG. 9 is a perspective view of the embodiment of FIG. 7 with the second bag in a different partially folded condition.

FIGS. 8 and 9 show the second bag 30 folded up at different levels against side panel 22. The second bag 30 is designed to be folded into these positions when it contains short cleaned items such as shirts or blouses. Bag 30 is provided with a strap or loop 33 at its bottom that may be placed around the hook at the top of the adjacent side panel (e.g. 26) of the first bag 20 to hold the folded second bag 30 in place against the side panel 22. This loop 33 may also be attached over one or more buttons 55 to hold bag 30 in a partially folded position, as shown in FIG. 8. It is to be appreciated that although the illustrated embodiment shows only one button 55, additional buttons may be provided at different locations on bag 30 for engagement with loop 33 to allow bag 30 to be folded up at different levels/places. See FIGS. 17-28. In addition to, or as an alternative to buttons 55, one or more interengaging strips of hooks and loops 56 (Velcro®) may be provided at different locations on bag 30 to allow bag 30 to be folded up, as shown in FIG. 9. As with buttons 55, it is to be appreciated that although the illustrated embodiment shows some locations for strips 56, additional strips 56 may be provided at different locations on bag 30 to allow bag 30 to be folded up at different levels/places. When not in use (e.g., when dirty items 19 are being collected in the first bag 20), bag 30 may also be folded as shown in FIGS. 8 and 9, or completely folded as shown in FIG. 2.

Figure 10:
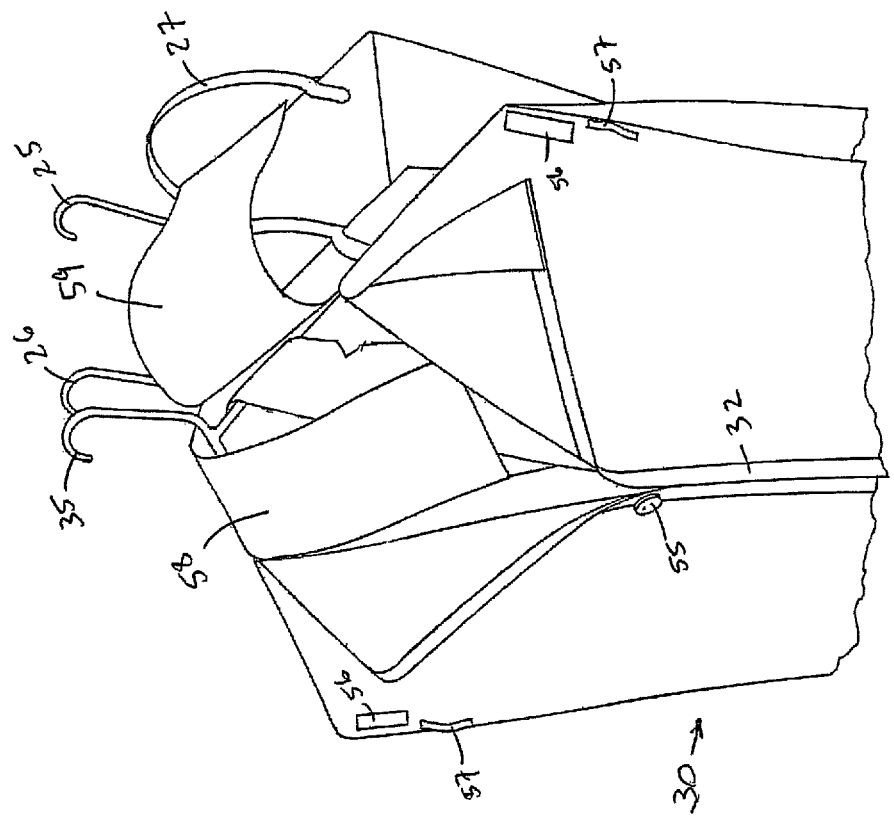
FIG. 10 is a detailed view of another embodiment of the invention showing the use of upper protective flaps.

Referring to FIGS. 10-11, it is seen that in the exemplary illustrated embodiment, bag 30 is provided with an expandable opening 31 at its top for receiving a large number of hanger hooks 35 of cleaned items when they are inserted into the unfolded second bag. Bag 30 may also be pleated along the sides to allow it to expand. In these embodiments, flaps 58 and/or 59 may be provided on the inside of bag 30 to be folded over the tops of the hanging garments to protect them from foreign materials (e.g., dust, dirt, water, etc.) that could enter through opening 31, as shown in FIG. 10. An additional loop 34 (not shown) may also be provided with bag 30 to hold the numerous hanger hooks 35 together. As with other embodiments, bag 30 is provided with a zipper 32 or other closing device along one side, and also provided with a strap or loop 33 at its bottom that may be placed around a hook at the top of the adjacent side panel (e.g. 26) of the first bag 20 to hold the folded second bag 30 in place against the side panel 22.

In some embodiments, one or more optional loops 57 may be provided on the outside of the second bag 30 to which labels or customer identification tags may be attached.

In alternative embodiments, a third bag 40 (not shown) having some or all of the available features of the second bag 30 may be provided for attachment to the opposite side panel (e.g. 21) of the first bag 20, to provide additional capacity for the return of cleaned items. In these embodiments, loop 51A on the third bag 40 may be engaged over hook 25 of panel 21 to hold the bags adjacent to each other; or bag 40 may be attached to or detachable from side panel 21.

Figure 14:
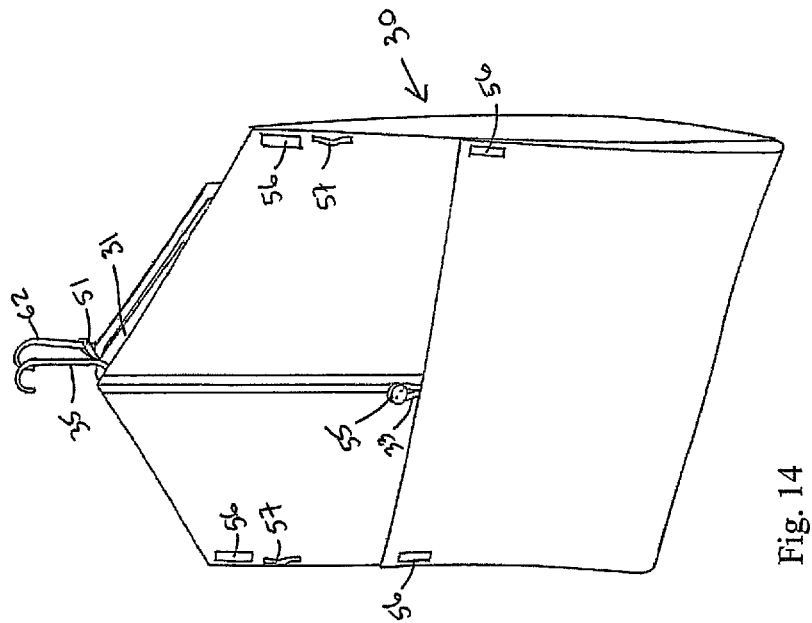
FIG. 14 is a perspective view of the embodiment of FIG. 13 in a partially folded condition.
Figure 13:
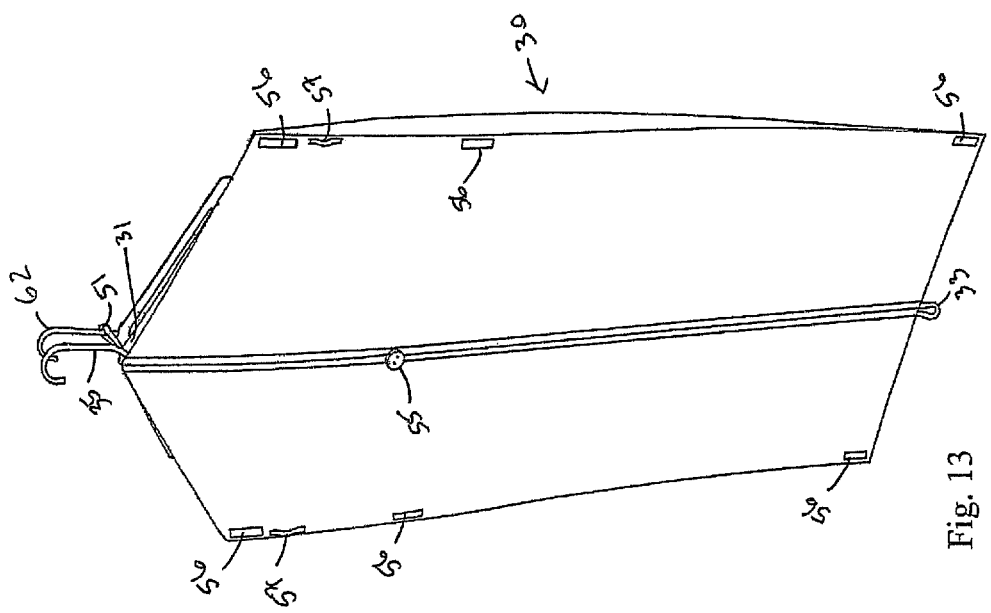
FIG. 13 is a perspective view of another embodiment of the present invention in an unfolded condition.
Figure 15:
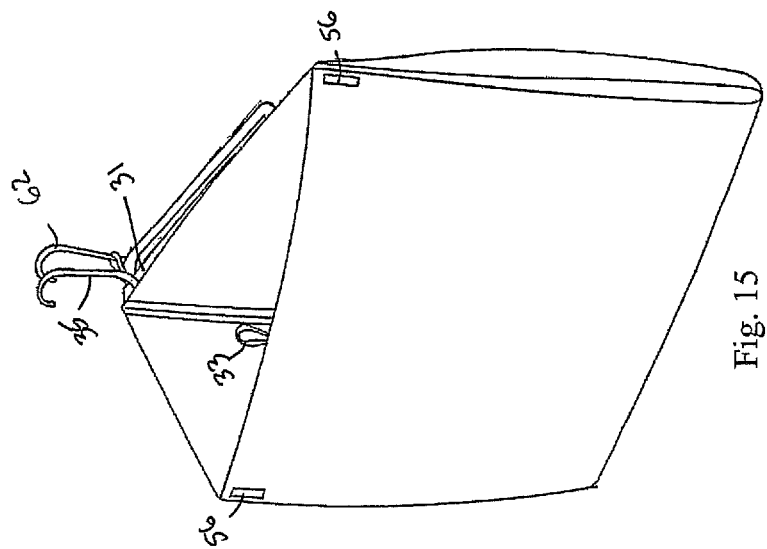
FIG. 15 is a perspective view of the embodiment of FIG. 13 in a different partially folded condition.
Figure 19:
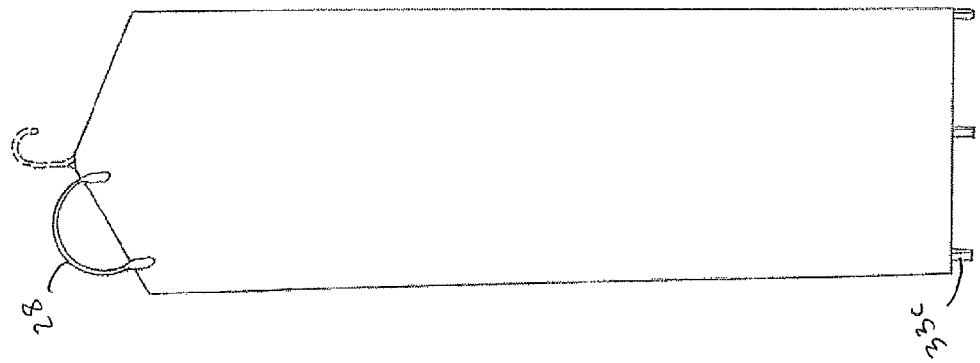
FIG. 19 is a rear view of the embodiment of FIG. 17.
Figure 18:
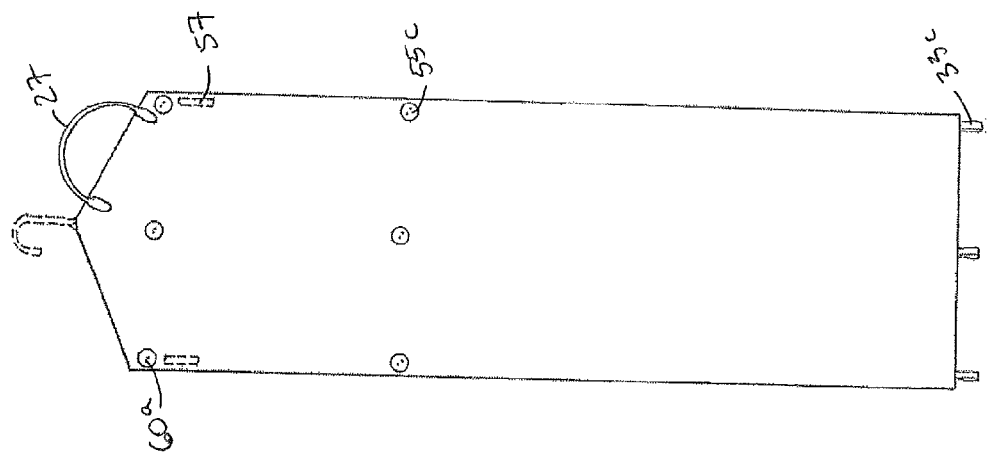
FIG. 18 is a front view of the embodiment of FIG. 17.
Figure 17:
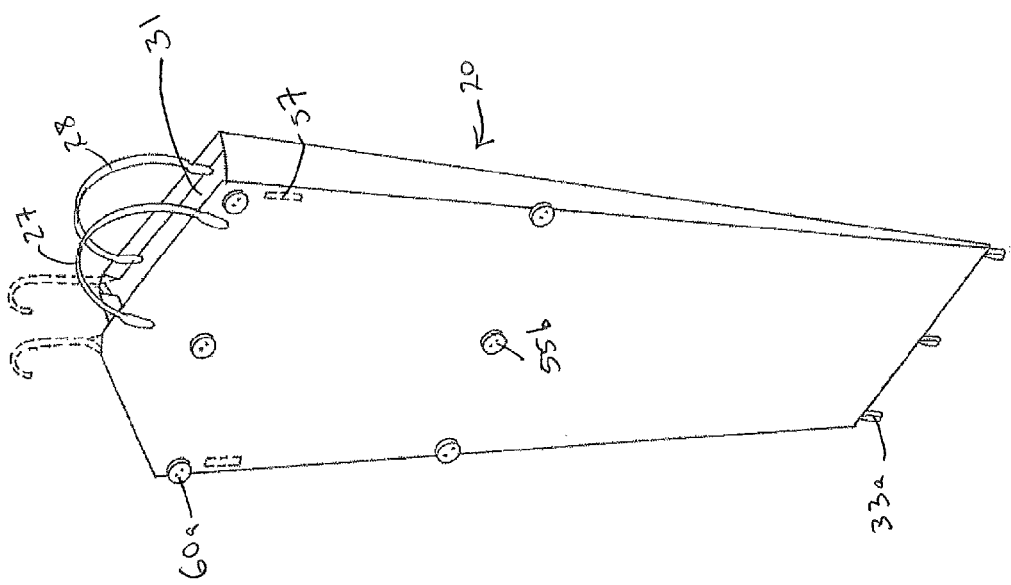
FIG. 17 is a perspective view of another embodiment of the present invention in an unfolded condition.

In alternative embodiments, such as those shown in FIGS. 13-16, bag 30 is provided by itself without bag 20. In these embodiments, a loop 51 is provided at the top of bag 30 that may be engaged over a hook of an adjacent hanger 62. In these embodiments, bag 30 may be separated from hanger 62 by disengaging loop 51 from hanger 62. Loop 51 may be in the form of a cord or strap, or may be provided in the form of a metal bracket 52 having a loop 51 at the top for engagement over a hanger 62. Bag 30 may be folded up at different levels depending on the length of the clean garments hanging inside. Bag 30 is provided with a strap or loop 33 at its bottom that may be placed around the hook of a hanger 62 for support. This loop 33 may also be attached over one or more buttons 55 to hold bag 30 in a partially folded position, as shown in FIG. 14. It is to be appreciated that although the illustrated embodiment shows only one button 55, additional buttons may be provided at different locations on bag 30 for engagement with loop 33 to allow bag 30 to be folded up at different levels/places. In addition to, or as an alternative to buttons 55, one or more interengaging strips of hooks and loops 56 (Velcro®) may be provided at different locations on bag 30 to allow bag 30 to be folded up, as shown in FIG. 15. As with buttons 55, it is to be appreciated that although the illustrated embodiment shows some locations for strips 56, additional strips 56 may be provided at different locations on bag 30 to allow bag 30 to be folded up at different levels/places. When not in use bag 30 may also be folded as shown in FIGS. 14 and 15, or completely folded as shown in FIG. 2.

Figure 16:
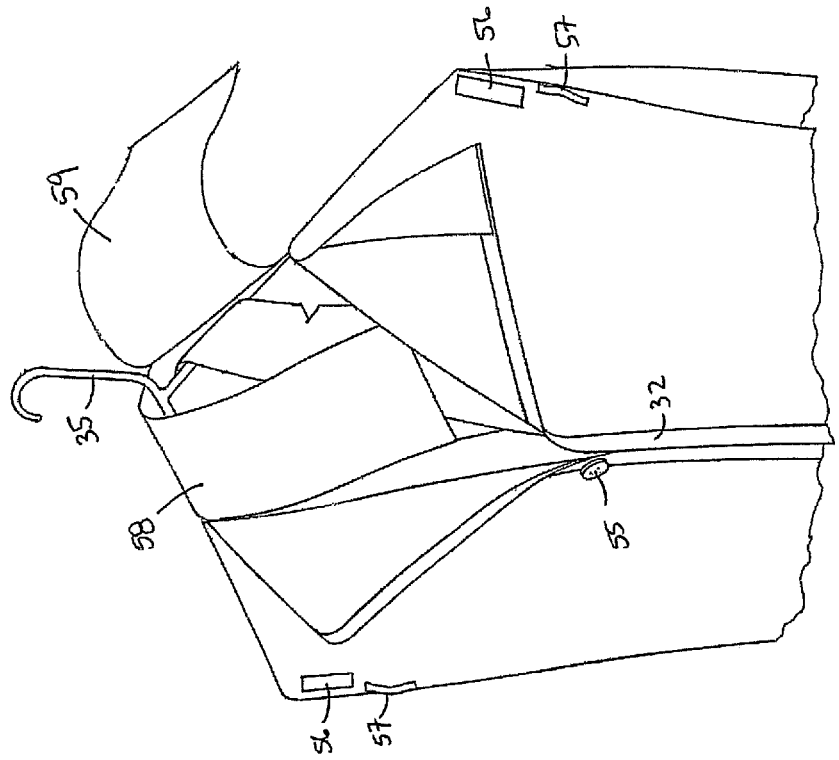
FIG. 16 is a detailed view of another embodiment of the invention showing the use of upper protective flaps.

Referring to FIGS. 13-16, it is seen that in the exemplary illustrated embodiment, bag 30 is provided with an expandable opening 31 at its top for receiving a large number of hanger hooks 35 of cleaned items when they are inserted into the unfolded bag 30. Bag 30 may also be pleated along the sides to allow it to expand. In these embodiments, flaps 58 and/or 59 may be provided on the inside of bag 30 to be folded over the tops of the hanging garments to protect them from foreign materials (e.g., dust, dirt, water, etc.) that could enter through opening 31, as shown in FIG. 16. An additional loop 34 (not shown) may also be provided with bag 30 to hold the numerous hanger hooks 35 together. As with other embodiments, bag 30 is provided with a zipper 32 or other closing device along one side, and also provided with a strap or loop 33 at its bottom that may be placed around a hanger to hold the folded bag 30 in place. In some embodiments, one or more optional loops 57 may be provided on bag 30 to which labels or customer identification tags may be attached.

Figure 25:
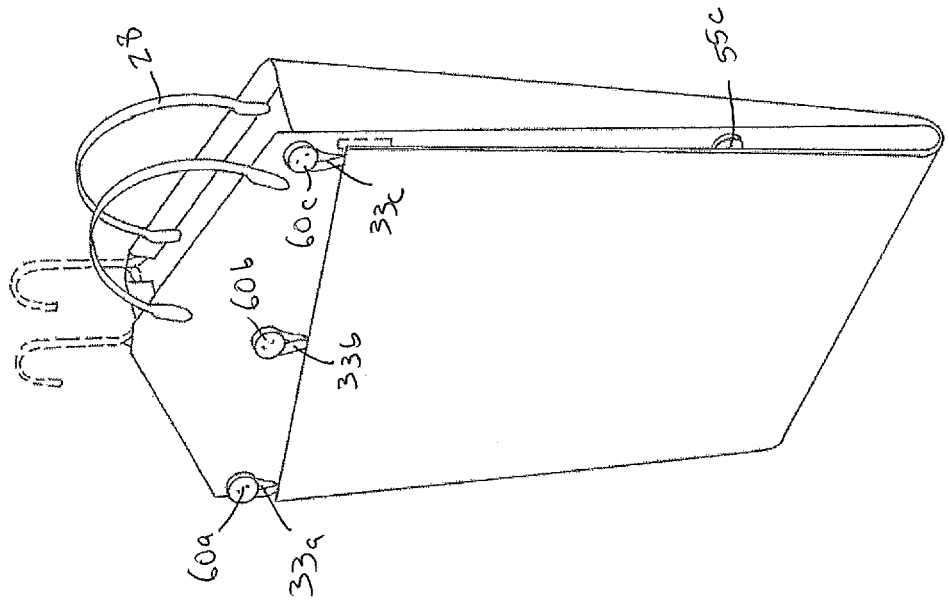
FIG. 25 is a perspective view of the embodiment of FIG. 24 in a different partially folded condition.
Figure 26:
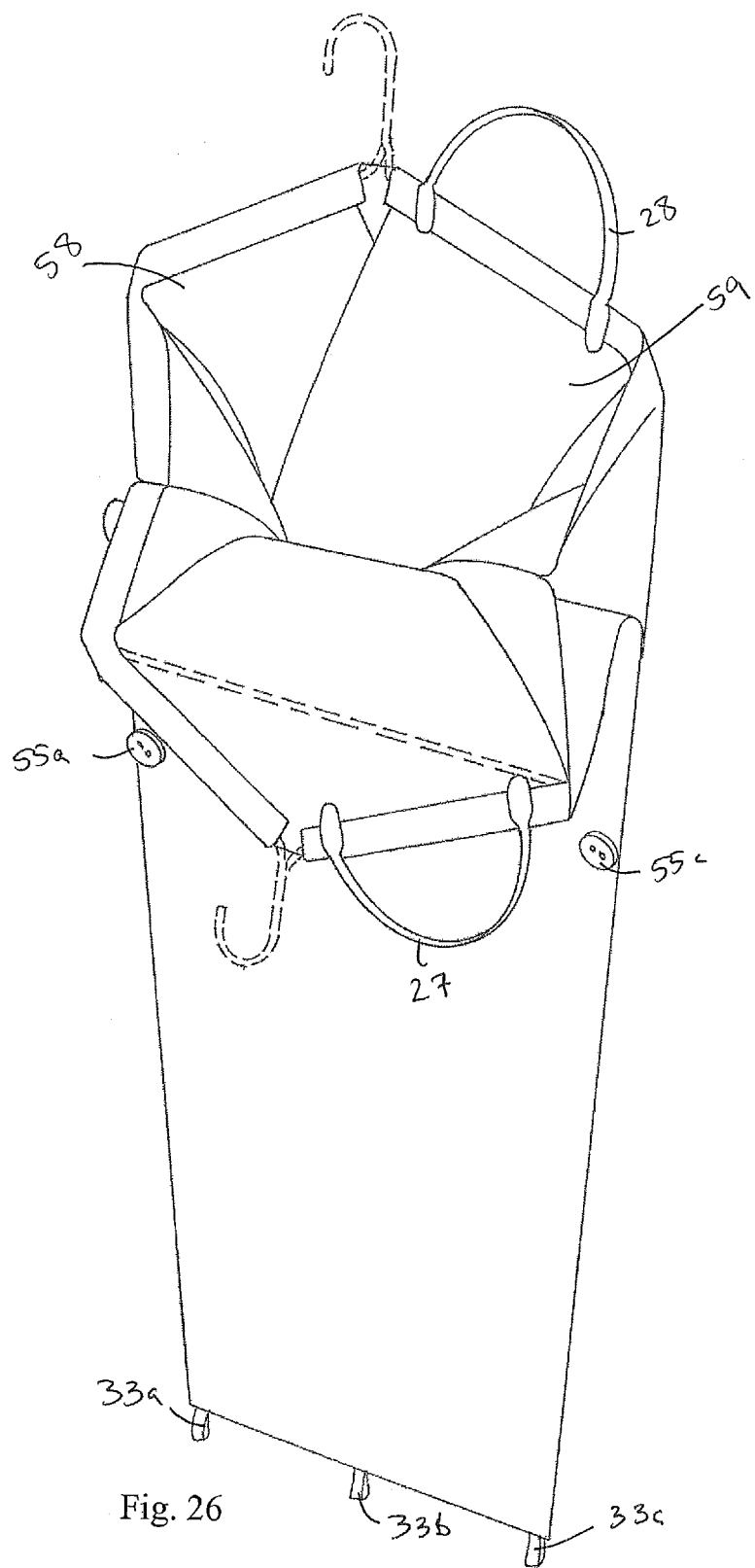
Figure 27:
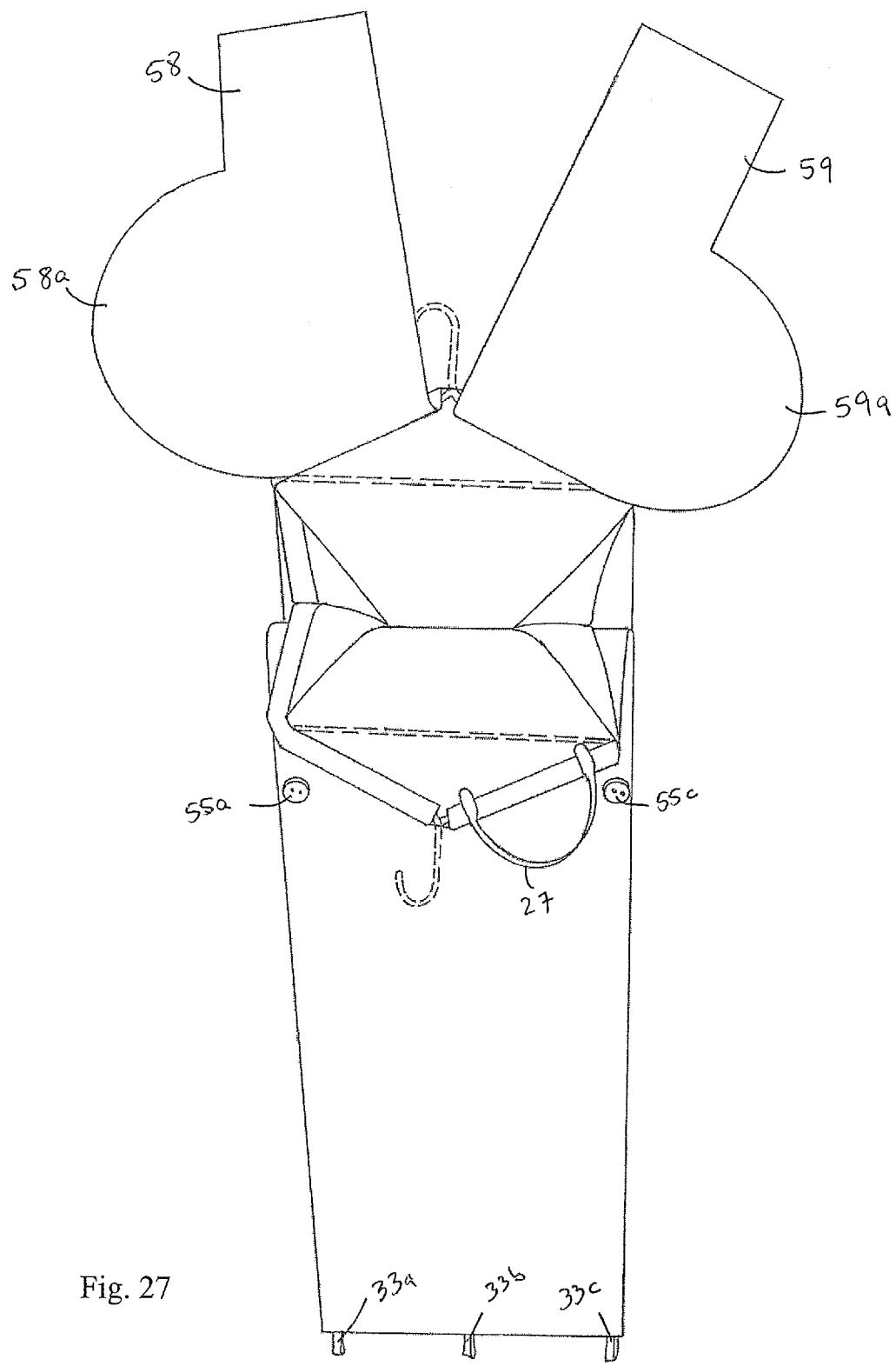
FIG. 27 is a perspective view of the embodiment of FIG. 26 an open condition showing internal flaps folded out.
Figure 28:
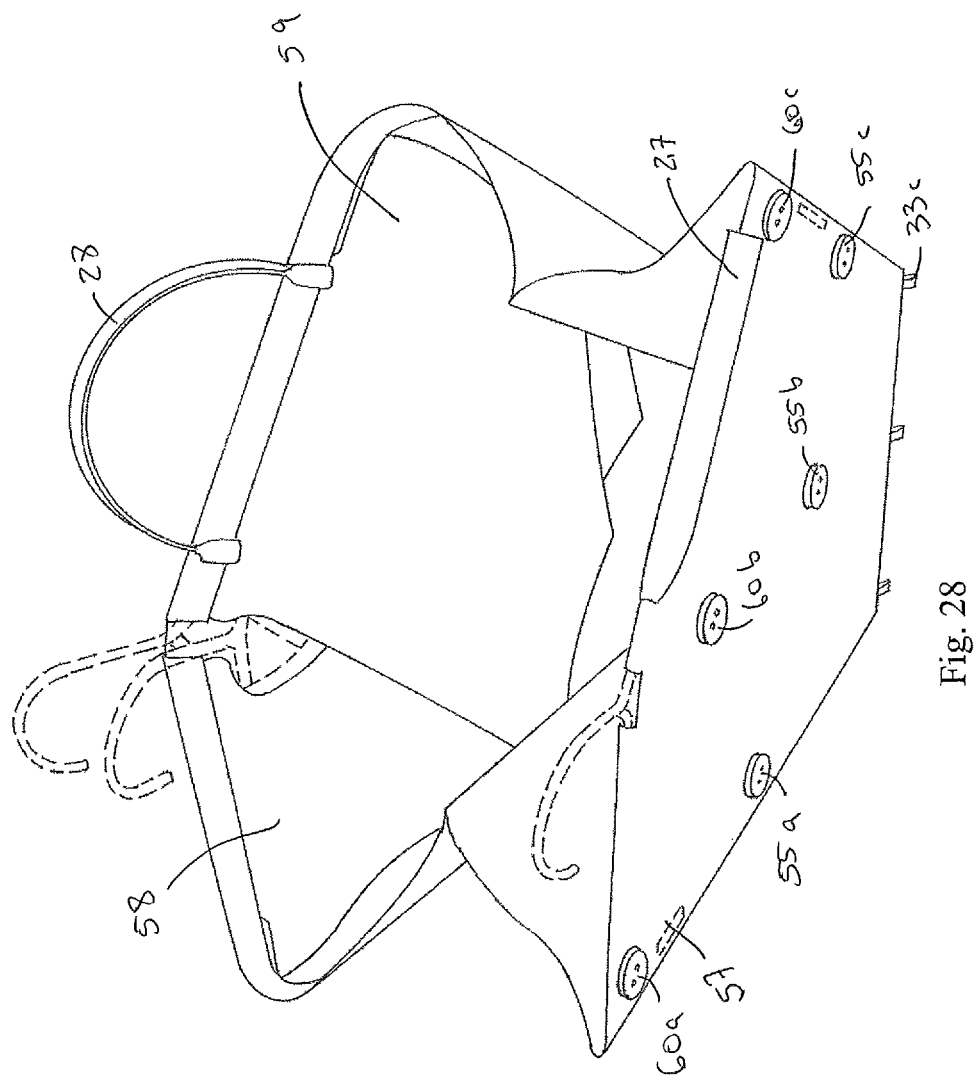
Figures 29, 30:
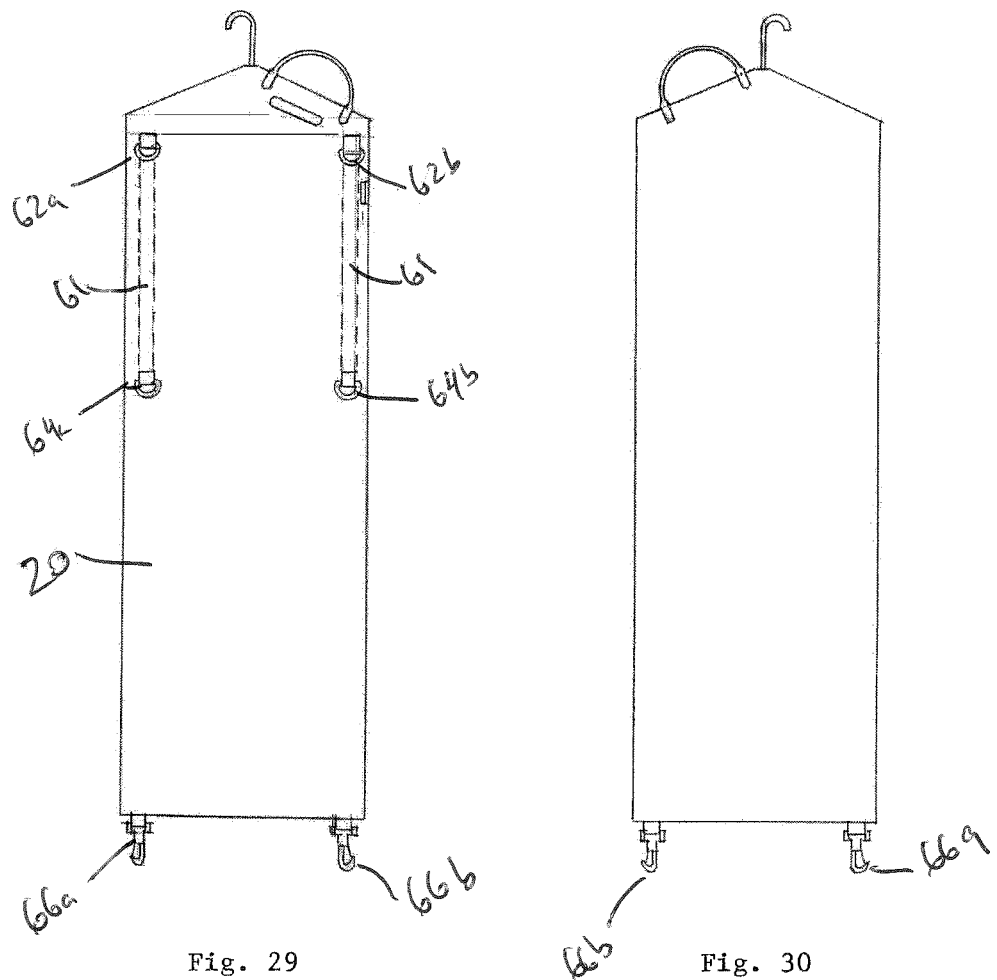
FIG. 29 is a front view of a single-bag embodiment of the present invention having D-rings and hooks.
FIG. 30 is a rear view of the embodiment of FIG. 29.
Figure 40:
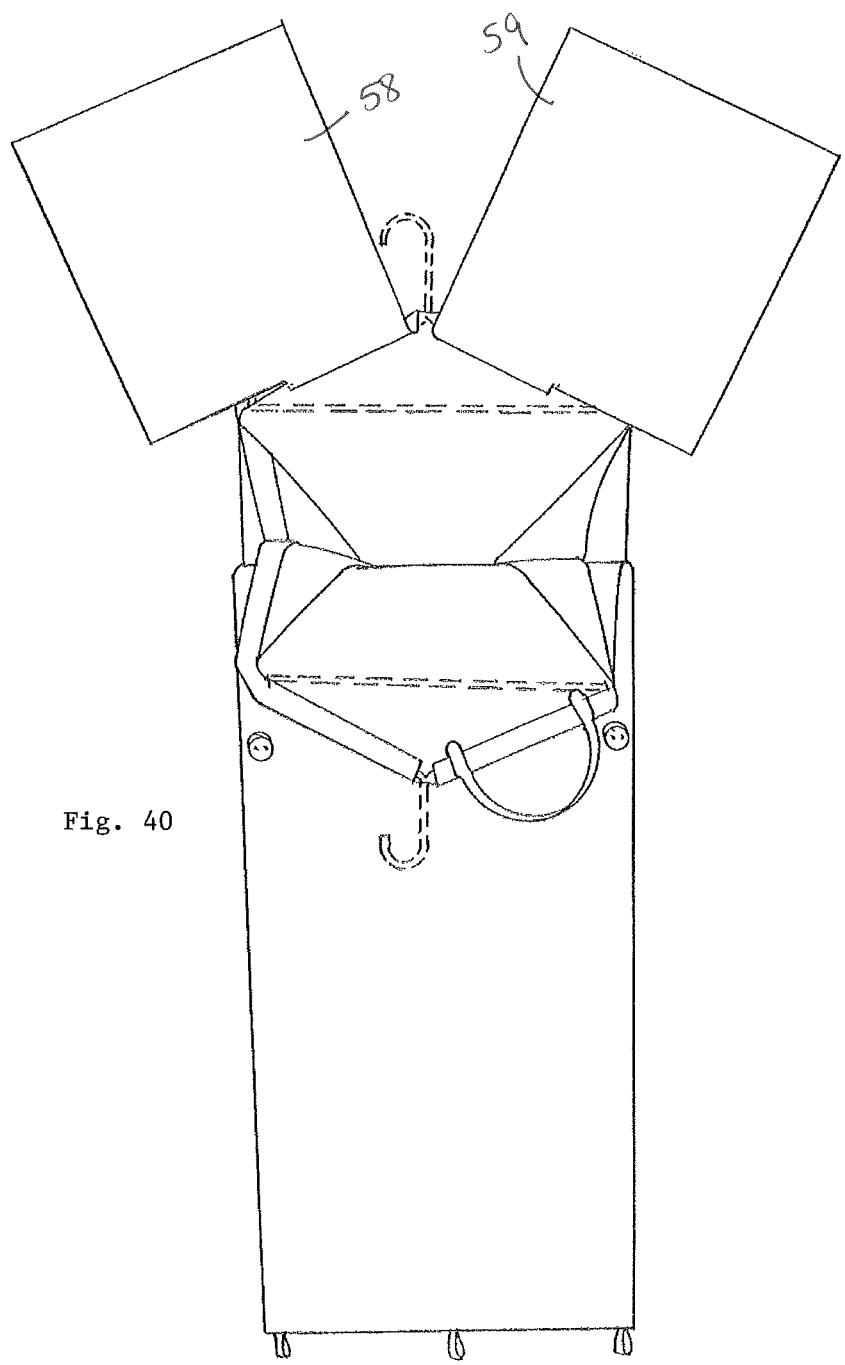
FIG. 40 is a front view of an alternative embodiment of the present invention in an open condition showing internal flaps folded out.

Referring to FIGS. 17-28, and FIGS. 29-37 it is seen that in these exemplary illustrated embodiments, bag 20 may be provided with an expandable opening 31 at its top for receiving a large number of hanger hooks 35 supporting cleaned items when they are inserted into the unfolded bag 20. Bag 20 may also be pleated along the sides to allow it to expand. In these embodiments, flaps 58 and/or 59 may be provided on the inside of bag 20 to be folded over the tops of the hanging garments to protect them from foreign materials (e.g., dust, dirt, water, etc.) that could enter through opening 31, as shown in FIGS. 26-28. In some embodiments, flaps 58, 59 may include additional extended portions 58a and 59a, as shown in FIG. 27, that may be engaged around clothing hanging in bag 20 to provide additional protection from foreign materials. As shown in FIG. 40, flaps 58, 59 may be provided in a generally rectangular shape having an upper corner removed, to facilitate easier use, insertion and removal. An additional loop 34 (not shown) may also be provided with bag 20 to hold the numerous hanger hooks 35 together.

Figure 24:
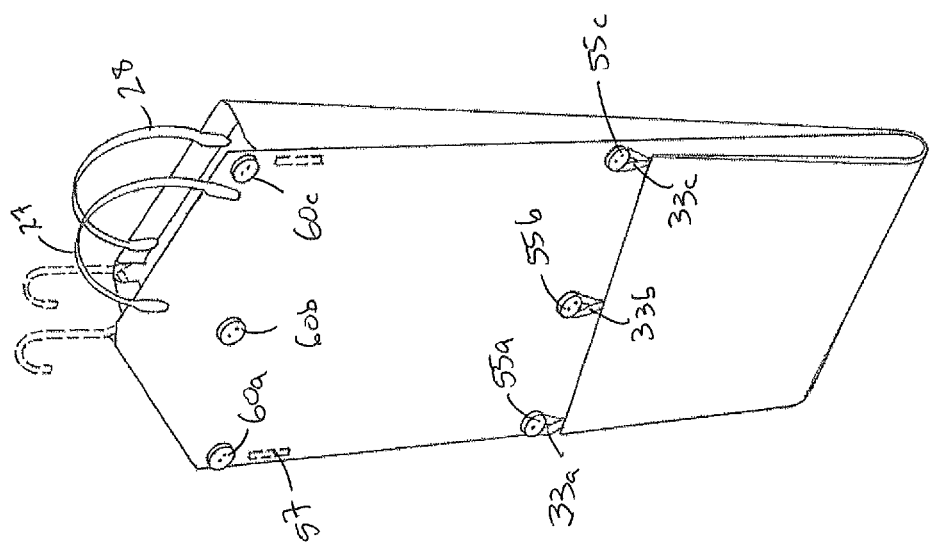
FIG. 24 is a perspective view of an embodiment of the present invention in a partially folded condition.

In the embodiments of FIGS. 17-28, and FIGS. 29-37, bag 20 may be provided with one or more straps or loops such as 33a, 33b and 33c at its bottom that are designed to be placed around corresponding buttons such as 55a, 55b and 55c to hold bag 20 in a partially folded position, as shown in FIG. 24. Additional sets of buttons such as 60a, 60b and 60c may be provided in different locations on bag 20 to allow the bag to be partially folded in another position, such as that shown in FIG. 25. It is to be appreciated that additional sets of buttons may be provided at different locations on bag 20 to provide additional options for partially folding bag 20 against itself. It is also to be appreciated that in alternative embodiments, a single loop (e.g. 33b) and a single button (55b) or buttons (55b and 57b) may be provided. In other embodiments, a pair of loops (e.g. 33a/33c) and a pair of buttons (55a/55c) or buttons (60a/60c) may be provided. In other embodiments, four or more loops and corresponding buttons may be provided.

It is to be appreciated that although the illustrated embodiments show three sets of buttons 55 and 60, additional buttons may be provided at different locations on bag 20 for engagement with loops 33 to allow bag 20 to be folded up at different levels/places. In addition to, or as an alternative to buttons 55 and 60, one or more interengaging strips of hooks and loops (e.g. Velcro®) may be provided at different locations on bag 20 to allow bag 20 to be folded up. As with buttons 55 and 60, it is to be appreciated that although the illustrated embodiment shows some locations for the buttons, additional strips may be provided at different locations on bag 20 to allow bag 20 to be folded up at different levels/places. When not in use, bag 30 may also be folded as shown in FIGS. 24 and 25. One or more optional loops 57 may be provided on bag 30 to which labels or customer identification tags may be attached.

Figure 31:
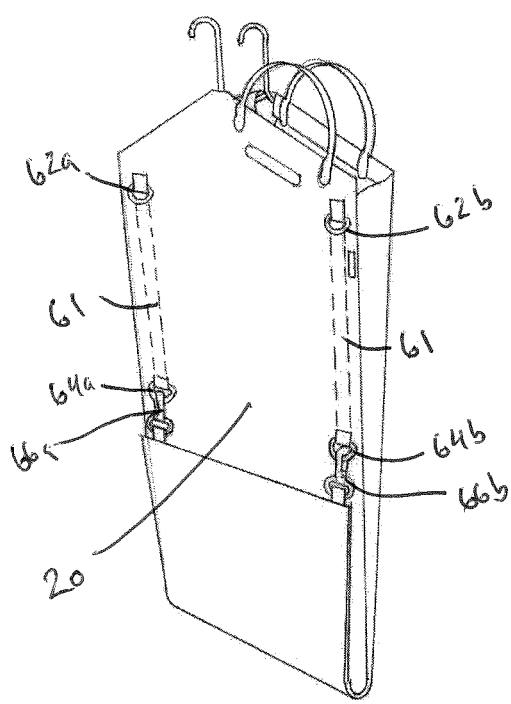
FIG. 31 shows the embodiment of FIG. 29 in a folded position with lower clips attached to D-rings near the middle of the bag creating the first alternate length.
Figure 32:
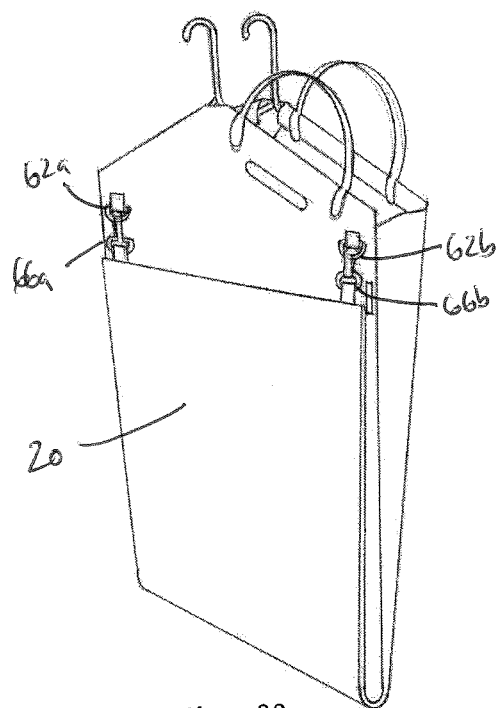
FIG. 32 shows the embodiment of FIG. 29 in a folded position with the lower clips attached to D-rings near the top of the bag creating the second alternate length.
Figures 33, 34:
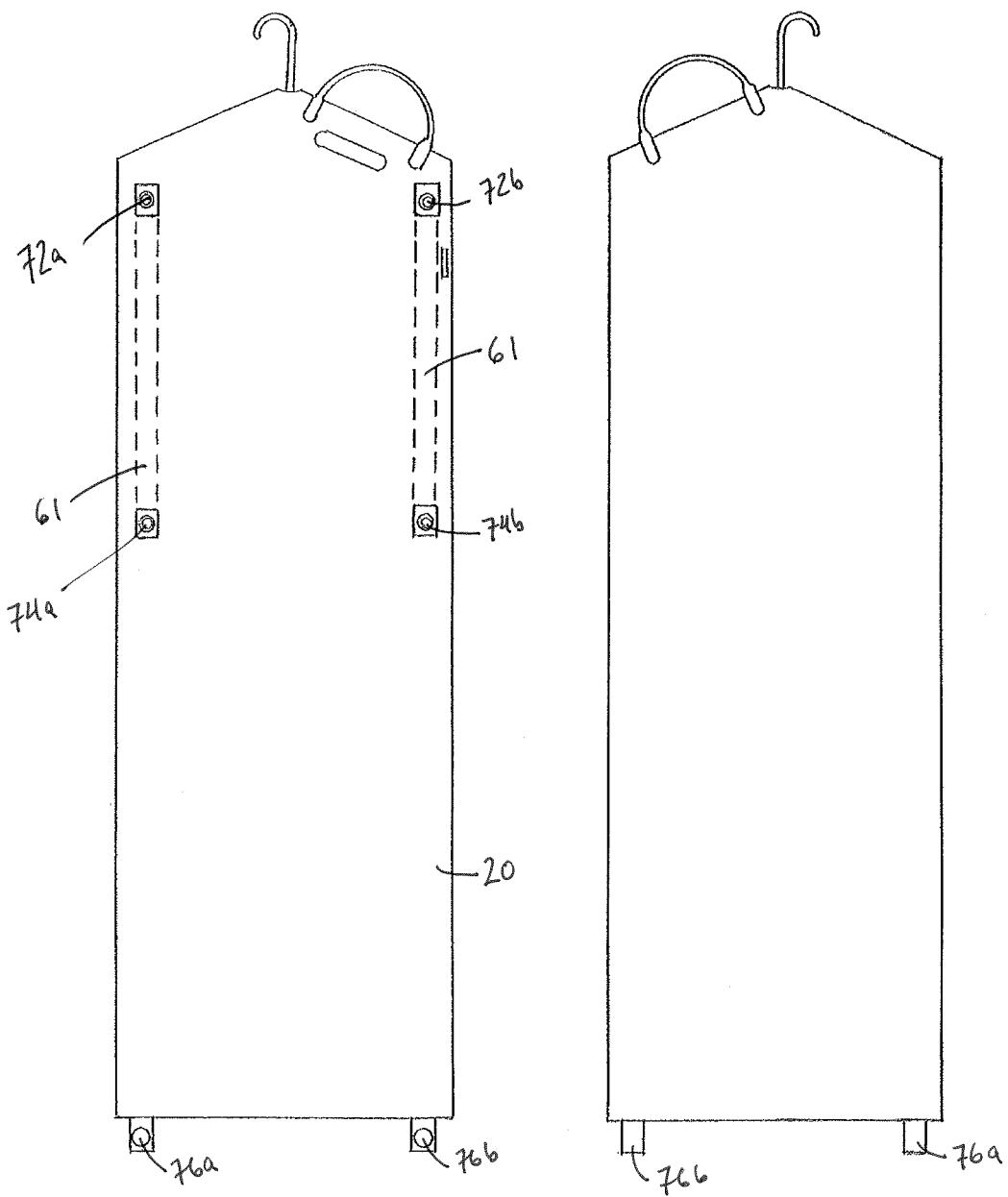
FIG. 33 is a front view of a single-bag embodiment of the present invention having buttons and snaps.
FIG. 34 is a rear view of the embodiment of FIG. 30.
Figure 35:
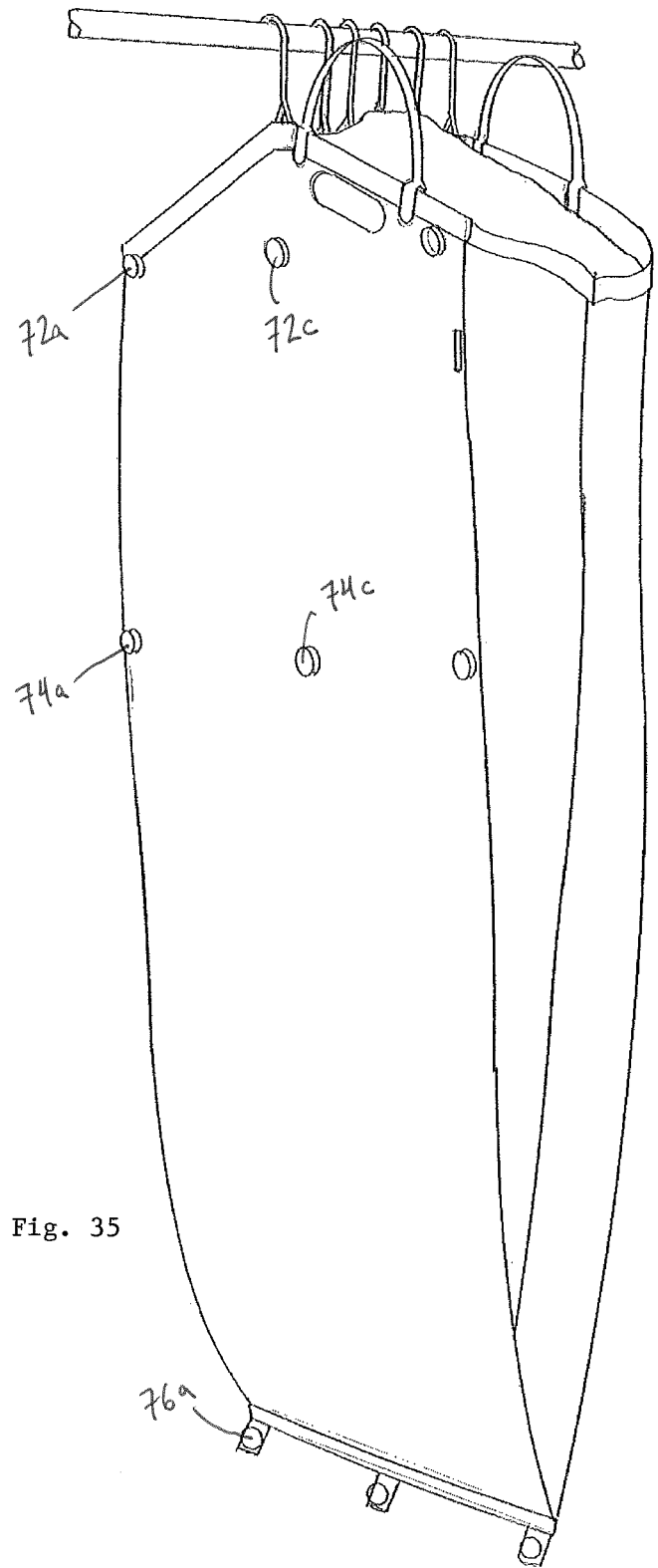
FIG. 35 is a perspective view of an embodiment of the present invention having a single bag having buttons and snaps.

In other alternative embodiments such as those shown in FIGS. 29-32, the loops 33 and buttons 55 may be replaced by clips 66 and D-rings 62, 64. In these embodiments, one or more clips such as 66a and 66c may be provided at the bottom of bag 20 that are designed to be clipped to corresponding D-rings such as 64a and 64b to hold bag 20 in a partially folded position, as shown in FIG. 31. This allows the bag to be folded so that it fits on a half-length garment conveyor at a cleaner or laundry, holding half-length garments such as shirts or blouses. Additional sets of D-rings such as 62a and 62b may be provided in different locations on bag 20 to allow the bag to be more completed folded in another position, such as that shown in FIG. 32. It is to be appreciated that additional sets of clips and D-rings may be provided at different locations on bag 20 to provide additional options for partially folding bag 20 against itself. In some embodiments, reinforced nylon strips 61 are provided to provide additional support and strength to D-rings 62, 64. In some embodiments, reinforced strips 61 made of nylon or the like may be provided on the side of the bag to provide additional support and strength to buttons 62, 64. It is to be appreciated that the illustrate strips 61 are provided on the inside of bag 20, but they may alternatively be provided on the outside. When provided on the inside, strips 61 may be looped over the bottom edge of hanger 75 for additional support.

Figure 37:
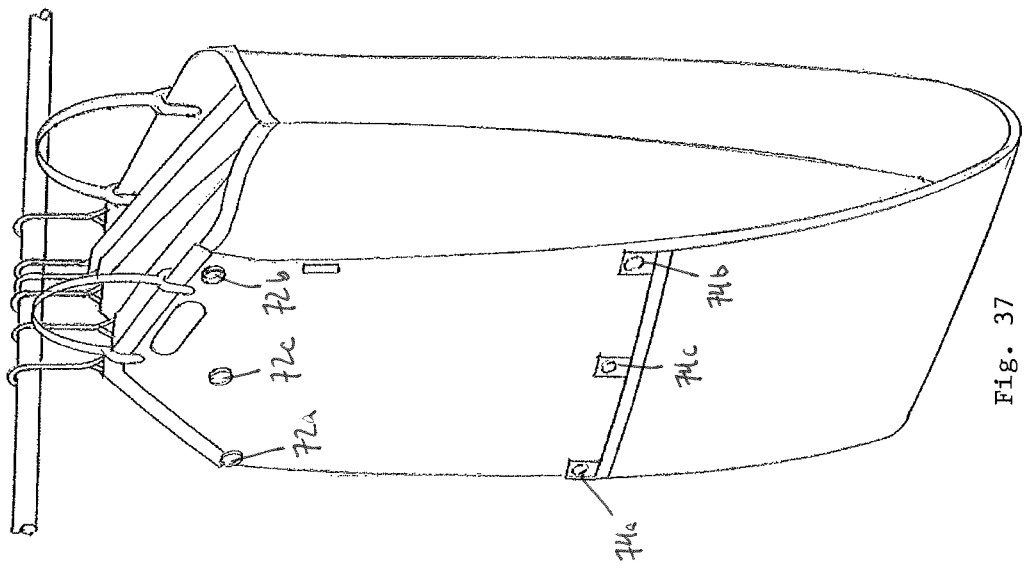
FIG. 37 is a perspective view of the embodiment of FIG. 35 having the bottom attached near the middle of one side in a partially folded position.
Figure 36:
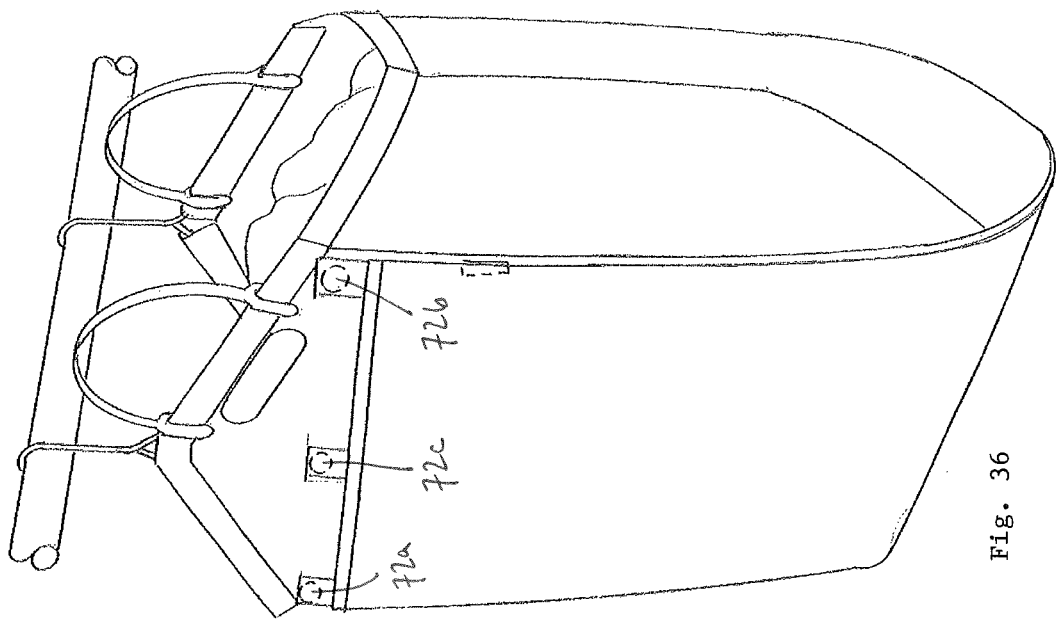
FIG. 36 is a perspective view of the embodiment of FIG. 35 having the bottom attached near the top of one side in a folded position.

In other alternative embodiments, the loops 33 and buttons 55 may be replaced by snaps 76 and buttons 72, 74, as shown in FIGS. 33-37. In these embodiments, one or more snaps such as 76a and 76c are provided at the bottom of bag 20 that are designed to be snapped into corresponding buttons such as 74a and 74b to hold bag 20 in a partially folded position, as shown in FIG. 37. This allows the bag to be folded so that it fits on a half-length garment conveyor at a cleaner or laundry, holding half-length garments such as shirts or blouses. Additional sets of buttons such as 72a and 72b (and 72c) may be provided in different locations on bag 20 to allow the bag to be more completed folded in another position, such as that shown in FIG. 36. It is to be appreciated that additional sets of snaps and buttons may be provided at different locations on bag 20 to provide additional options for partially folding bag 20 against itself. In some embodiments, reinforced strips 61 made of nylon or the like may be provided on the side of the bag to provide additional support and strength to buttons 72, 74. It is to be appreciated that the illustrate strips 61 are provided on the inside of bag 20, but they may alternatively be provided on the outside. When provided on the inside, strips 61 may be looped over the bottom edge of hanger 75 for additional support.

Figure 4:
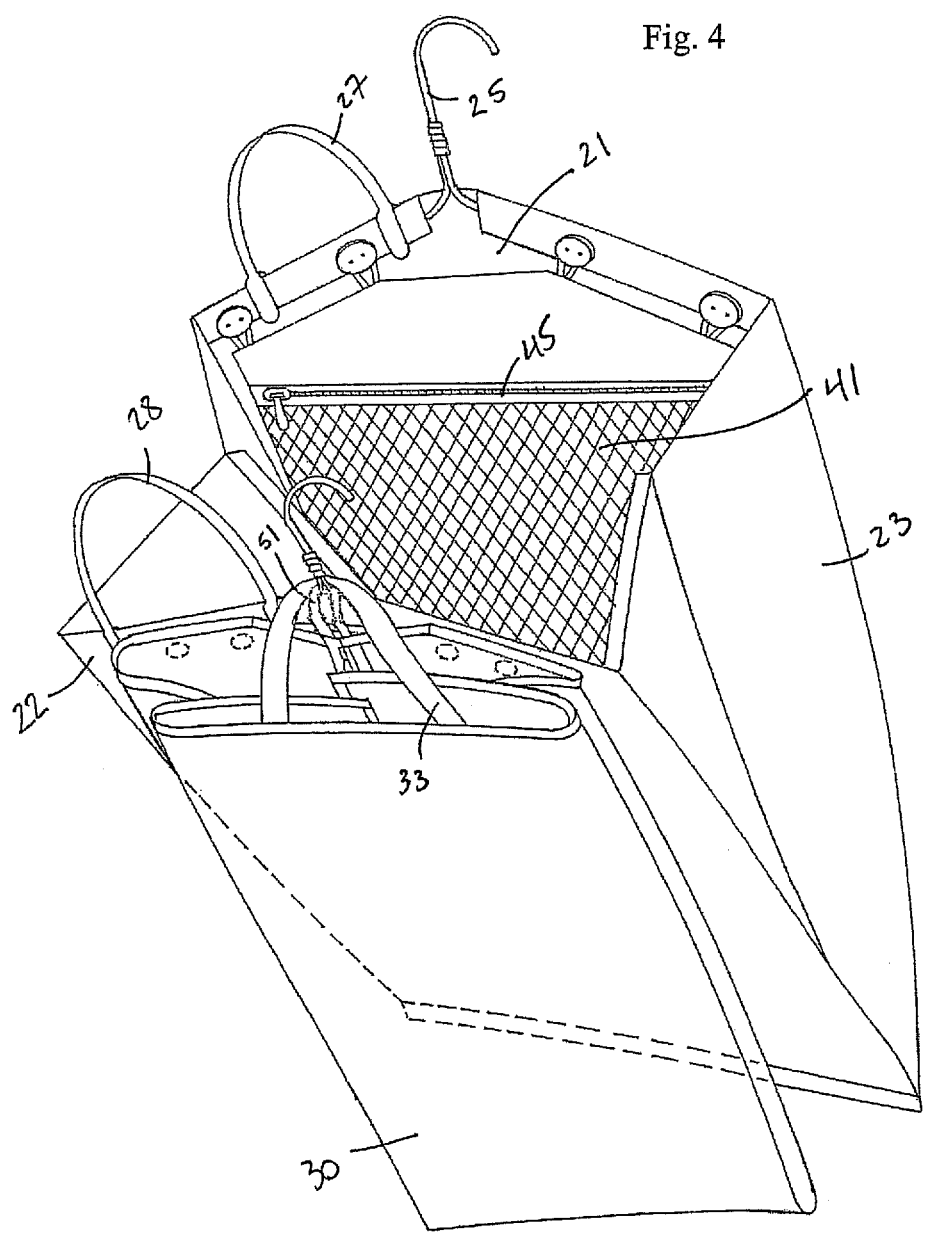
FIG. 4 is a perspective view of another embodiment of the present invention.
Figure 5:
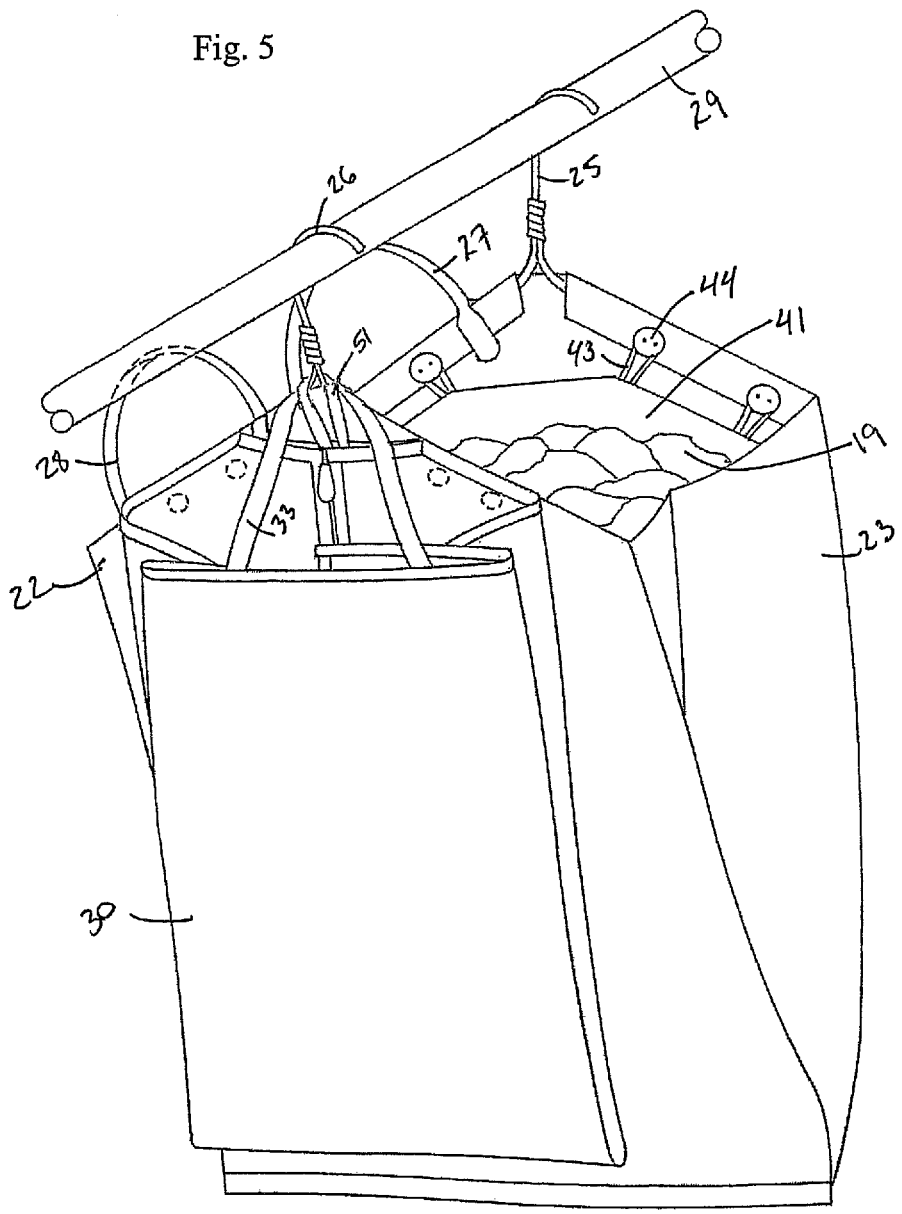
FIG. 5 is a perspective environmental view of the embodiment of FIG. 4 with the second bag in a folded condition.
Figure 6:
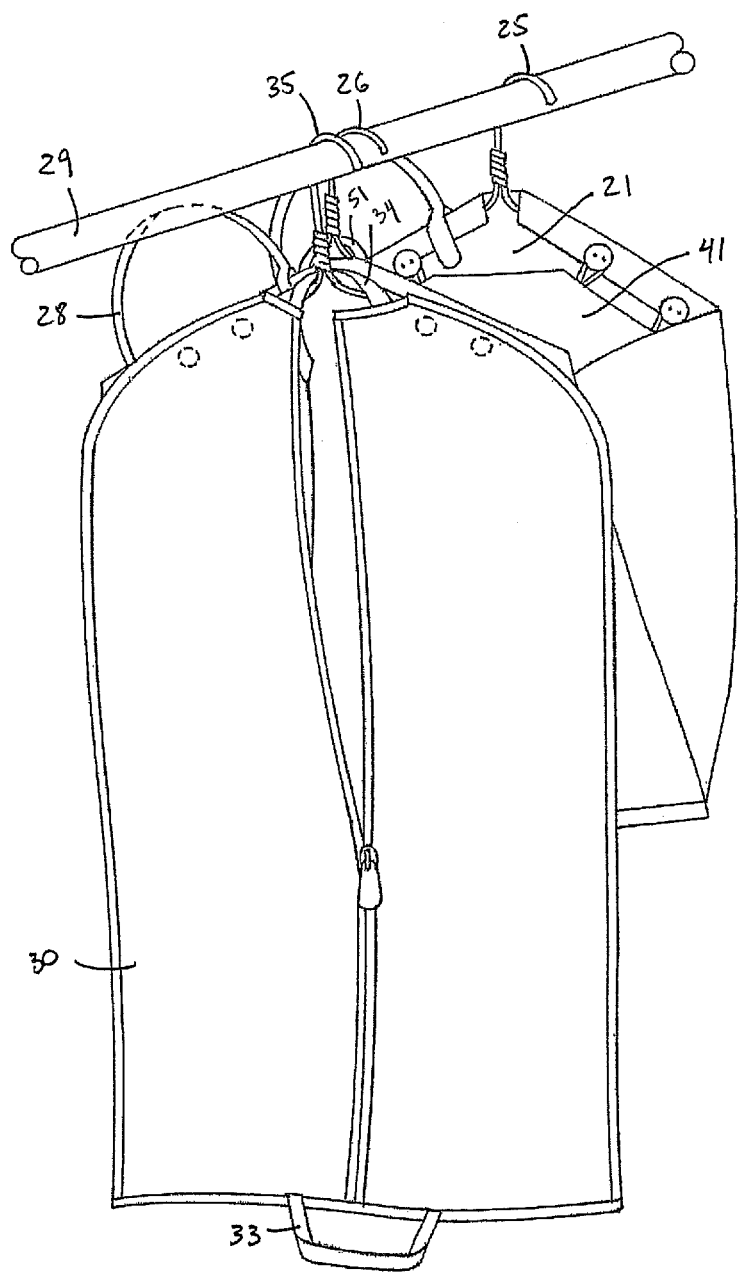
FIG. 6 is a perspective environmental view of the embodiment of FIG. 5 with the second bag in an unfolded condition.
Figure 43:
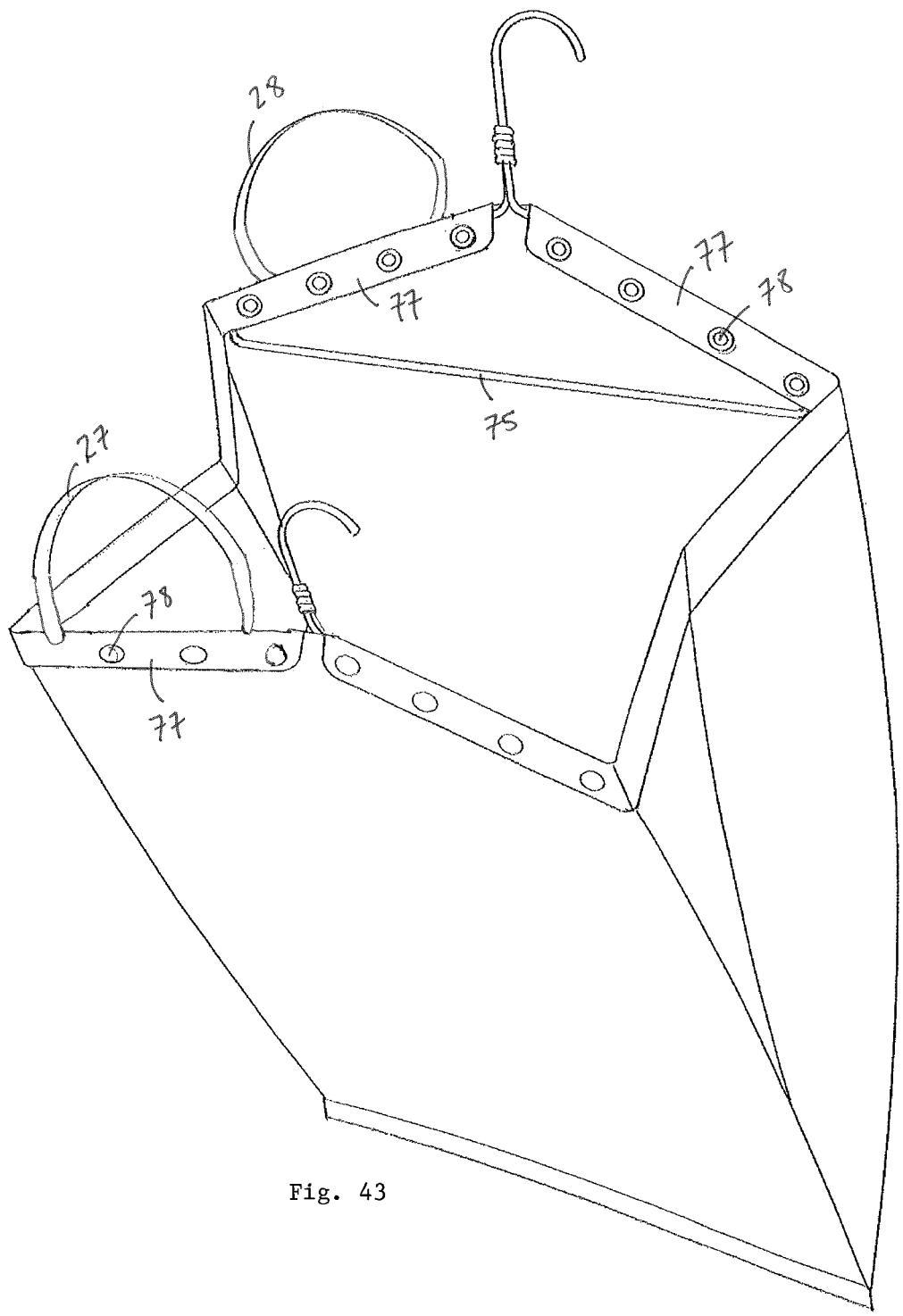
FIG. 43 is a top plain view of the embodiment of FIG. 29 without the net bag previously shown.

In some embodiments bag 20 is attached to a hanger 75 by use of one or more snap mechanisms 78 as shown in FIGS. 4 and 43. This allows for the hanger 75 to be removed and the bag 20 to be laundered with ease. Referring to FIG. 43, it is seen that snaps 78 are provided along the top of bag 20, on flaps 77 that fold over the upper arm of hanger 75 to engage the bag with such hangers. It is to be appreciated that flaps 77 may be provided to fold from the inside out, or the outside in, over hanger 75. Openings 79 may be provided in flaps 77 to accommodate receipt of the ends of handles 27, 28.

Figure 38:
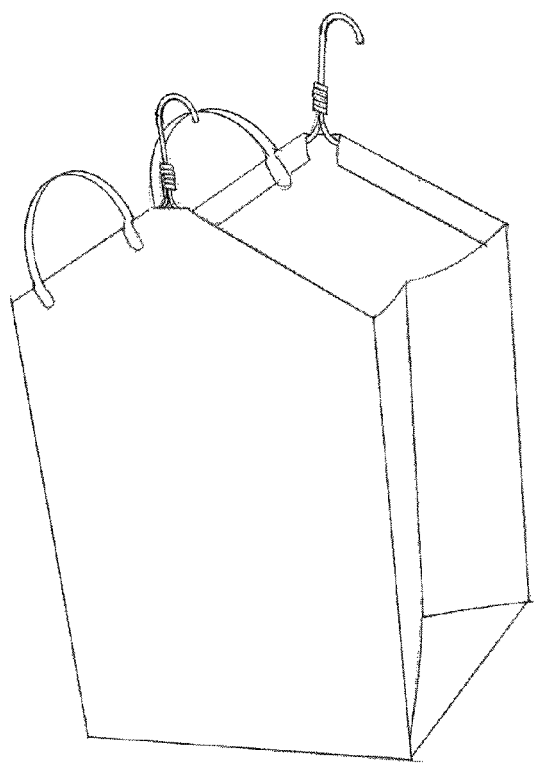
FIG. 38 shows an embodiment of a garment bag with the bottom of the bag in a flat position.
Figure 39:
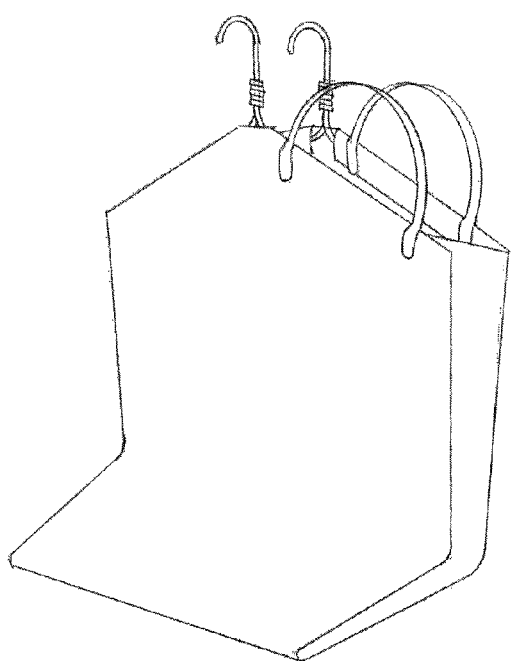
FIG. 39 shows the embodiment of FIG. 38 in a folded position.
Figure 42:
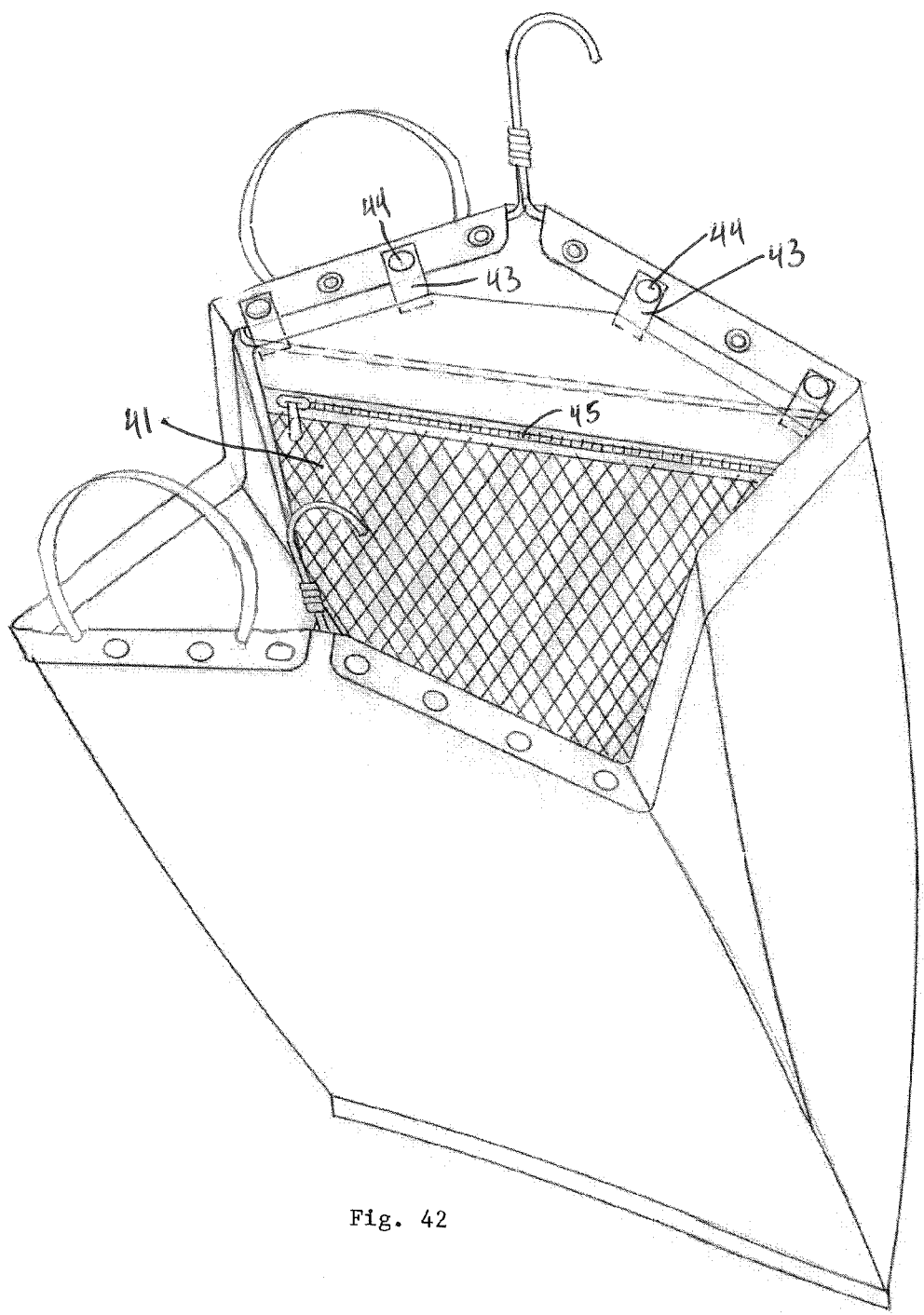
FIG. 42 is a top plain view of the embodiment of FIG. 29 and includes a net bag with a zipper for additional storage.
Figure 44:
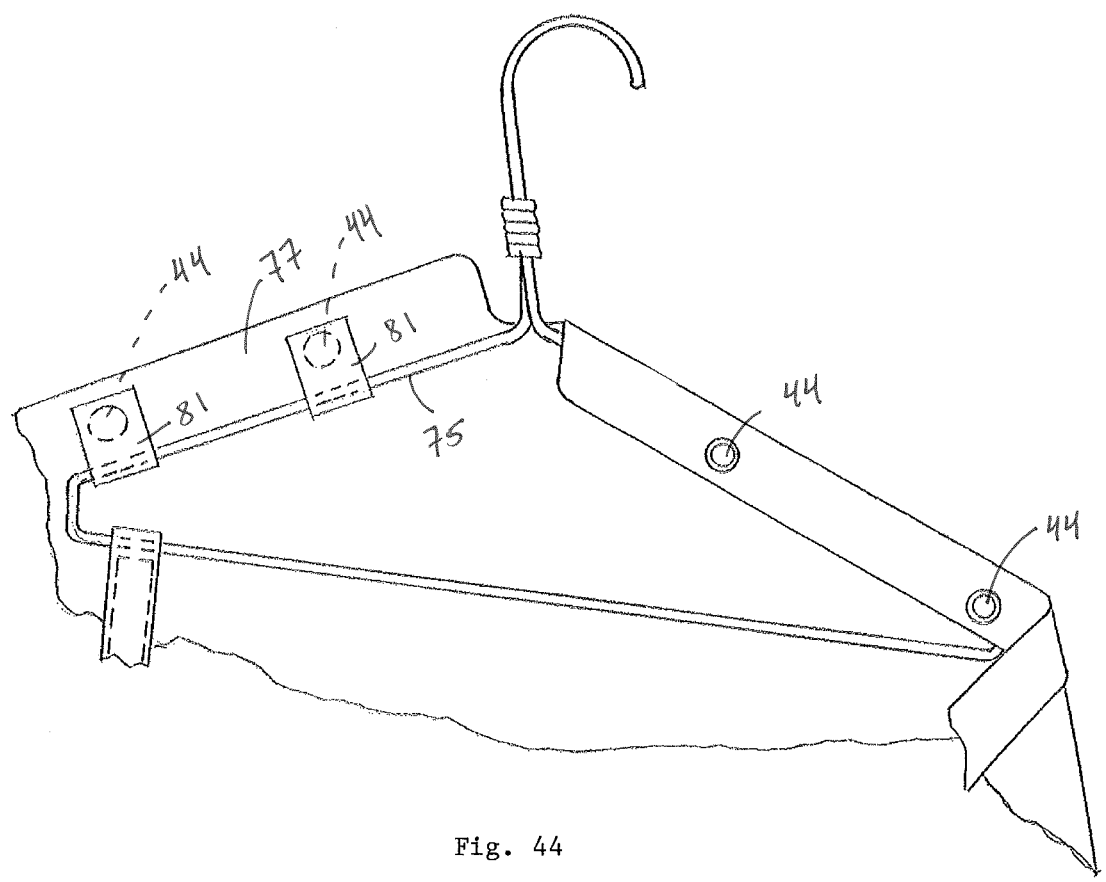
FIG. 44 is a perspective view of the embodiment of FIG. 29 which includes a detachable hanger to allow the bag to be laundered.

Referring to FIGS. 42 and 44, it is seen that reinforcing fabric 81 in the form of nylon or other strips may be provided in flaps 77 to provide support to buttons 44 used to hold the removable garment bag 41. These reinforcements are provided on the underside of flaps 77 as shown in FIG. 44, and support buttons 44 which hold loops or straps 43 of bag 41. In some embodiments the bag 20 may have a tapered bottom instead of a flat bottom 66 as shown in FIG. 38.

Figure 41:
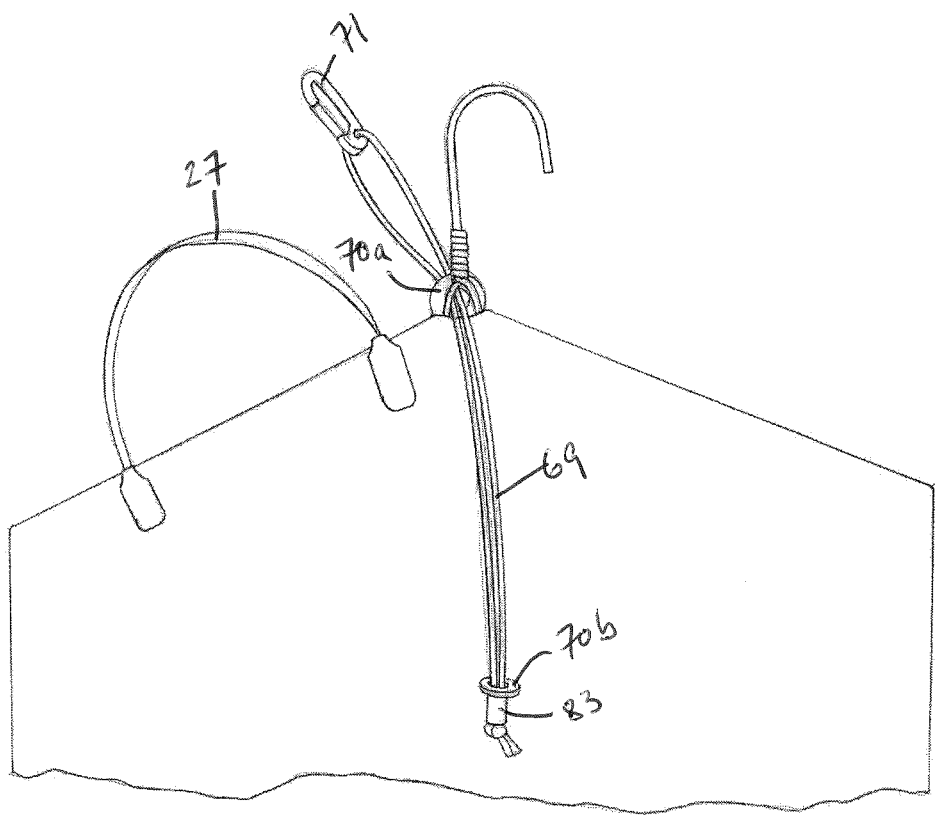
FIG. 41 is a perspective view of an embodiment of a bag of the invention that includes a cord with a thumb snap and washer at one end and a second washer at the opposite end.

The bag 20 may also include a cord 69 which may be doubled over and which may include a clip 71 on one end, a thumb spring 83 on the other end, and two washers 70a, 70b in between the two ends as shown in FIG. 41. One washer 70a and the clip 71 is on the adjacent side of the hanger 75 while the other large washer 70b is positioned next to the thumb spring 83. Washers 70a, 70b prevent cord 69 from being pulled through the necks of hangers 75. In use, when thumb spring 83 is moved towards the adjacent clip 71 and engaged, washer 70a will hold the bag in a closed position.

In use, bag 20 of the multiple bag system is hung on a clothing rod 29 in a closet, with the second bag 30 (and optional third bag 40, if provided) folded up against one side of the bag 20, preferably with loop 51 engaged over a hook 25, 26 of first bag 20. Soiled garments and clothing items 19 are collected in the first bag 20 until it is full enough to take to the laundry/dry cleaner. The laundry/dry cleaner removes the garments and clothing items 19 from the first bag 20 and cleans them. The clean garments and clothing items are then hung on hangers which include hooks 35. The second bag 30 is unfolded and unzipped, and the clean hanging items are inserted into the second bag, with their hanger hooks 35 protruding through the opening 31 in the top of the second bag 30. An optional loop 34 provided with bag 30 may be used to hold hanger hooks 35 together. If multiple items are inserted into bag 30 causing opening 31 to be extended, flaps 54, 55 may be folded over the tops of the clothing items to protect them from dust, dirt, water or other materials. Bag 30 is then zipped up to protect the clean items inside, and may be partially folded up as shown in FIGS. 8 and 9 if only short items (e.g., shirts/blouses) have been inserted into second bag 30, to allow it to be placed on a short garment conveyor, and for ease of transport. Additional items may be inserted into a third bag 40, if provided, which may be zipped and folded as with second bag 30. The bags are then returned to the user, with bag 30 (and 40, if provided) protecting the clean items during transport. Upon or following return, the user removes the clean items from bag 30 (and 40, if provided), and then folds the second bag up against a side of the first bag 20. The cycle is then repeated, with dirty and soiled garments again being collected in the first bag 20 until it is full enough to take to the laundry/dry cleaner.

In use, the alternative bag 30 of the embodiments of FIGS. 13-16 is hung in a folded or unfolded condition on a hanger 62 in the closet of a user. Empty bag 30 is delivered to the dry cleaner along with dirty garments, clothing and laundry items to be cleaned. The dirty items are cleaned, and then hung on hangers 35. If no bag 30 is provided by the user, the dry cleaner may provide one. Bag 30 is unfolded and unzipped, and the clean hanging items are inserted into the bag, with their hanger hooks 35 protruding through the opening 31 in the top of bag 30. An optional loop 34 provided with bag 30 may be used to hold hanger hooks 35 together. If multiple items are inserted into bag 30 causing opening 31 to be extended, flaps 58, 59 may be folded over the tops of the clothing items to protect them from dust, dirt, water or other materials. Bag 30 is then zipped up to protect the clean items inside, and may be partially folded up as shown in FIGS. 14 and 15 if only short items (e.g., shirts/blouses) have been inserted into second bag 30, to allow it to be placed on a short garment conveyor, and for ease of transport. The bag is then returned to the user, with bag 30 protecting the clean items during transport. Upon or following return, the user removes the clean items from bag 30 and may then fold the bag up or leave it unfolded, hanging it on a hanger 62 using loop 51. The cycle is then repeated, with dirty and soiled garments again being collected and delivered with bag 30 to the laundry/dry cleaner.

In use, the stand alone alternative bag 20 of the embodiments of FIGS. 17-28 and 29-37 is hung in a folded or unfolded condition on a hanger 62 in the closet of a user. Bag 20 is delivered to the dry cleaner along with dirty garments, clothing and laundry items to be cleaned. The dirty items are cleaned, and then hung on hangers 35. If no bag 20 is provided by the user, the dry cleaner may provide one. Bag 20 is unfolded, and the clean hanging items are inserted into the bag, with their hanger hooks 35 protruding through the opening 31 in the top of bag 20. If only shorter garments such as shirts or blouses are present, bag 20 may be folded up so that it may be placed on the dry cleaner's conveyor for shorter-length garments. However, if longer garments (e.g. dresses) are included, then bag 20 may be completely unfolded and hung on the cleaner's conveyor for longer items. An optional loop 34 provided with bag 20 may be used to hold hanger hooks 35 together. If multiple items are inserted into bag 20 causing opening 31 to be extended, flaps 58, 59 may be folded over the tops of the clothing items to protect them from dust, dirt, water or other materials. Bag 20 may be partially folded up as shown in FIGS. 24 and 25 if only short items (e.g., shirts/blouses) have been inserted into bag 20, to allow it to be placed on a short garment conveyor, and for ease of transport. The bag is then returned to the user, with bag 20 protecting the clean items during transport. Upon or following return, the user removes the clean items from bag 20 and may then fold the bag up or leave it unfolded, hanging it on a hanger 62. The cycle is then repeated, with dirty and soiled garments again being collected and delivered with bag 20 to the laundry/dry cleaner.

It is to be appreciated that the single-bag embodiments of FIGS. 28-37, the bag 20 may be hung in a closet or armoire, with the bottom of the bag brought up against one side using any of the embodiments described herein (e.g. D-rings and clips, buttons and snaps, interengaging hooks/loops, buttons and loops, etc.). This shortens the length of the bag 20 and reducing both the interior space available to receive soiled garments as well as the space the bag takes up in the closet or armoire. Attaching the bottom of the bag near the top will reduce the interior space the most, while attaching the bottom of the bag near the middle will allow for a larger space. Once filled, the bag 20 is taken to the cleaner who cleans the garments, and then returns the cleaned garments in the bag which may be opened to full length, if necessary, to accommodate lengthy clothing items, such as a dress.

It is to be understood that variations and modifications of the present invention may be made without departing from the scope thereof. In particular, different embodiments of the first 20 and second bag 30 of the invention may include different combinations or permutations of some or all of the various features illustrated and/or described herein. It is also to be understood that the present invention is not to be limited by the specific embodiments disclosed herein, but only in accordance with the appended claims when read in light of the foregoing specification.

What is claimed is:

1. A method of transporting garments for cleaning comprising the steps of:
    a. receiving soiled clothing items in a garment bag, said bag comprising a pair of oppositely positioned side panels joined together at one end, and a pair of oppositely positioned pleated end panels attached between said side panels forming said bag, an opening at a top thereof for receiving at least one hanger hook, and at least one interior flap provided adjacent to said top opening for folding over cleaned items hanging inside said bag to protect the items from outside materials; a pair of lower clips at a bottom of said bag; and a pair of upper D-rings provided on a side panel of said bag for engagement with said clips for holding said bag against itself in a folded condition;
    b. removing and cleaning said clothing items;
    c. hanging said clothing items on hangers with hooks;
    d. inserting said clothing items into said folded bag such that said hooks of said hangers protrude through said opening in said bag; and
    e. folding said at least one flap over said clothing items.

2. The method of claim 1 comprising the additional step of folding said garment bag against itself using said clips and D-rings.

3. The method of claim 1 wherein said garment bag further comprises a detachable accessory bag, and comprising the additional steps of: inserting any accessories into said accessory bag, and attaching said accessory bag to said garment bag.

4. The method of claim 1 wherein said garment bag further comprises a draw string and comprising the additional step of closing the top of said garment bag using said draw string.

5. The method of claim 1 wherein said garment bag further comprises a pair of closable upper flaps, one pair provided on each of said side panels at said upper end, and comprising the additional step of engaging said flaps with the corresponding hanger hook for said side panel.

6. The method of claim 5 wherein said step of engaging said flaps with said hanger hooks comprises the step of engaging buttons located on said flaps with snaps located on said corresponding side panels.

7. The method of claim 3 wherein said garment bag further comprises snaps located on said upper flaps, and comprising the additional step of attaching an accessory bag by engaging buttons on said accessory bag with said snaps.

8. A method of transporting garments for cleaning comprising the steps of:
    a. receiving a garment bag containing at least one soiled clothing item, said bag comprising an interior, an exterior, a pair of oppositely positioned side panels, an opening at a top thereof for receiving at least one hanger hook, and a pair of interior protective flaps provided adjacent to said top opening for folding over clothing items hanging inside said bag to protect said items from outside materials; a pair of lower engagement devices at a bottom exterior of said bag; and a pair of upper exterior engagement devices on a side panel of said bag for engagement with said lower engagement devices for holding said bag against itself in a folded condition;
    b. removing said at least one clothing item;
    c. cleaning said at least one clothing item;
    d. hanging said at least one clothing item on at least one hanger having a hook;
    e. inserting said at least one clothing item into said bag such that a hook of said at least one hanger protrudes through said opening in said bag; and
    e. folding said protective flaps over said clothing items.

9. The method of claim 8 wherein said garment bag is received in a folded condition where said upper and lower engagement devices have been engaged with each other, and comprising the additional step of unfolding said garment bag by disengaging said engagement devices.

10. The method of claim 8 comprising the additional step of folding said garment bag against itself using said engagement devices.

11. The method of claim 8 wherein an elongated closable opening is provided on a side of said garment bag, and comprising the additional step of closing said opening after the at least one clothing item has been inserted into the bag.

12. The method of claim 11 wherein a zipper is provided along said elongated opening for opening and closing said opening.

13. The method of claim 11 wherein a plurality of snaps are provided along said elongated opening for opening and closing said opening.

\* \* \* \* \*